Aug. 8, 1961         W. H. NEWELL ET AL         2,995,296
                     TARGET COURSE PREDICTOR
Filed April 22, 1954                            13 Sheets-Sheet 1
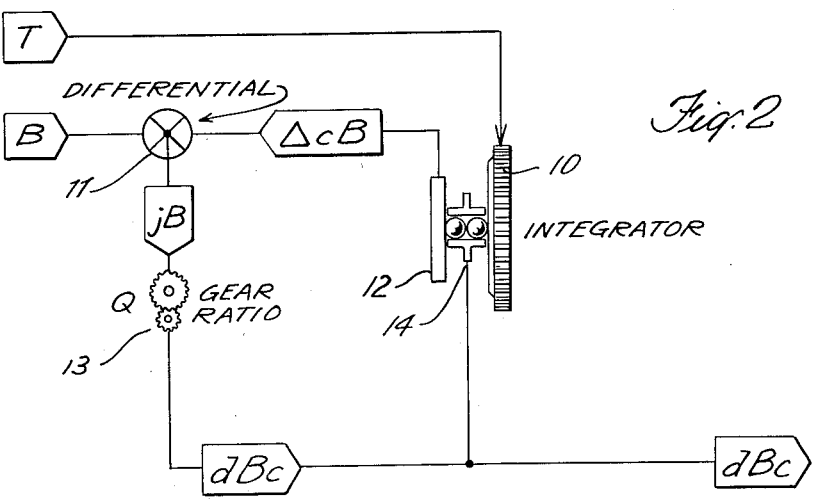
INVENTORS
WILLIAM H. NEWELL
GEORGE A. CROWTHER
BY
Victor D. Borst
ATTORNEY TIME CONSTANT (Tc) FOR RATE COMPUTING LOOP.

EQUIVALENT RATE COMPUTING CIRCUIT.

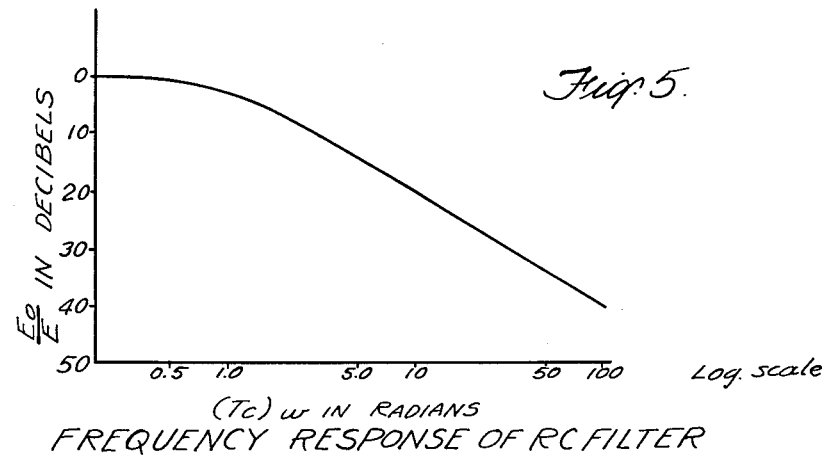
FREQUENCY RESPONSE OF RC FILTER
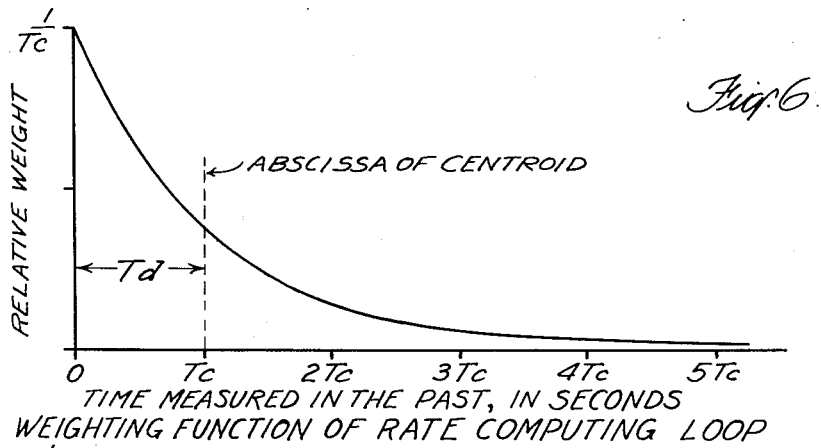
WEIGHTING FUNCTION OF RATE COMPUTING LOOP
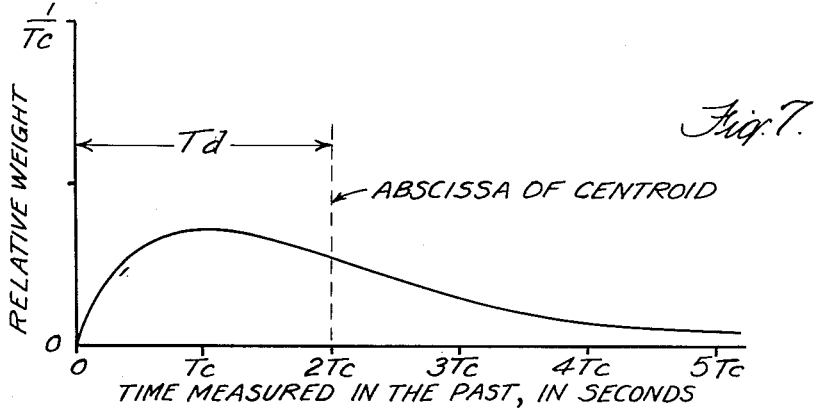
WEIGHTING FUNCTION OF ACCELERATION SMOOTHING
NETWORK IN COMBINATION WITH RATE COMPUTING LOOP.

COMPONENTS AFFECTED BY CHANGES IN B.

COMPONENTS NOT AFFECTED BY CHANGES IN B.

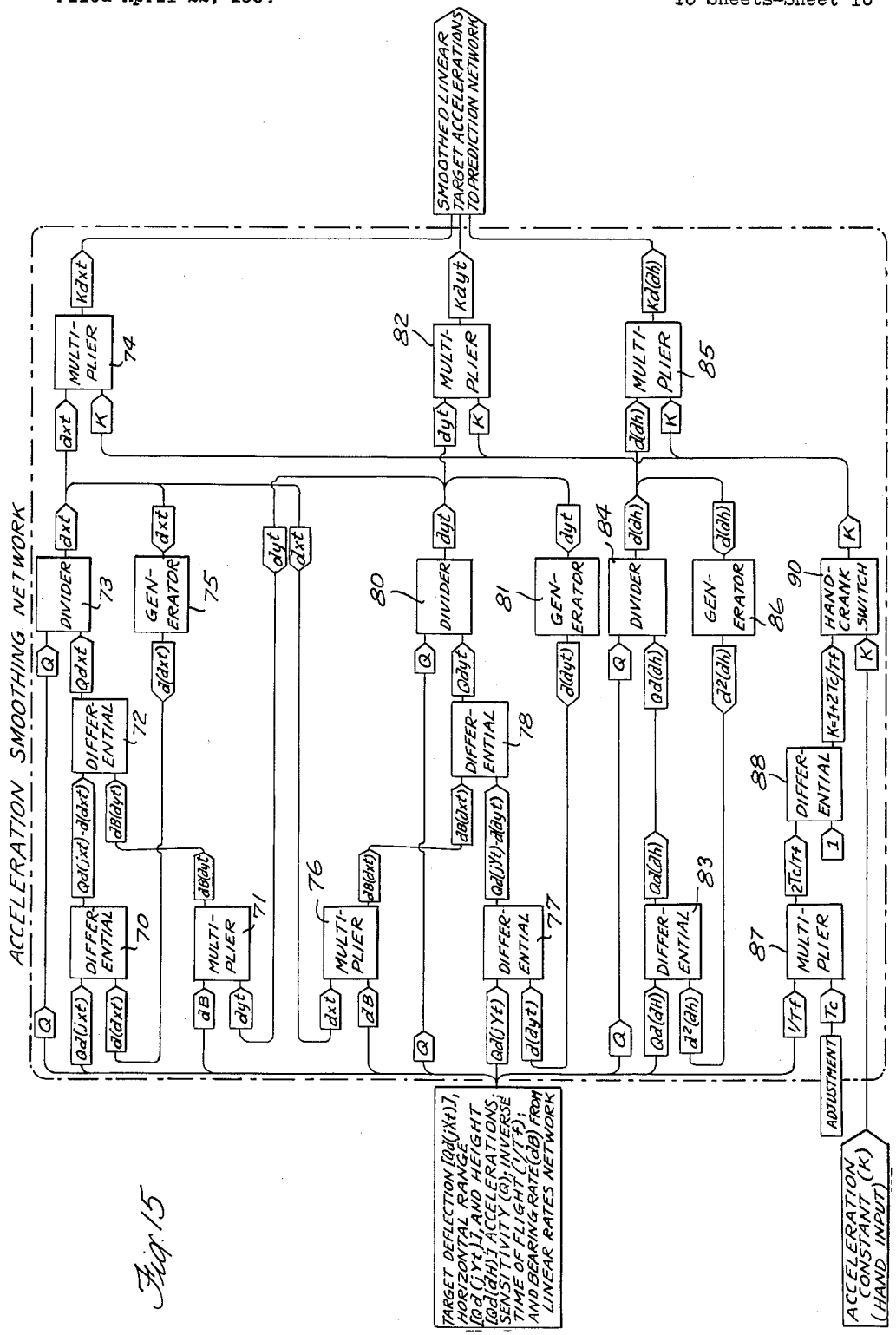

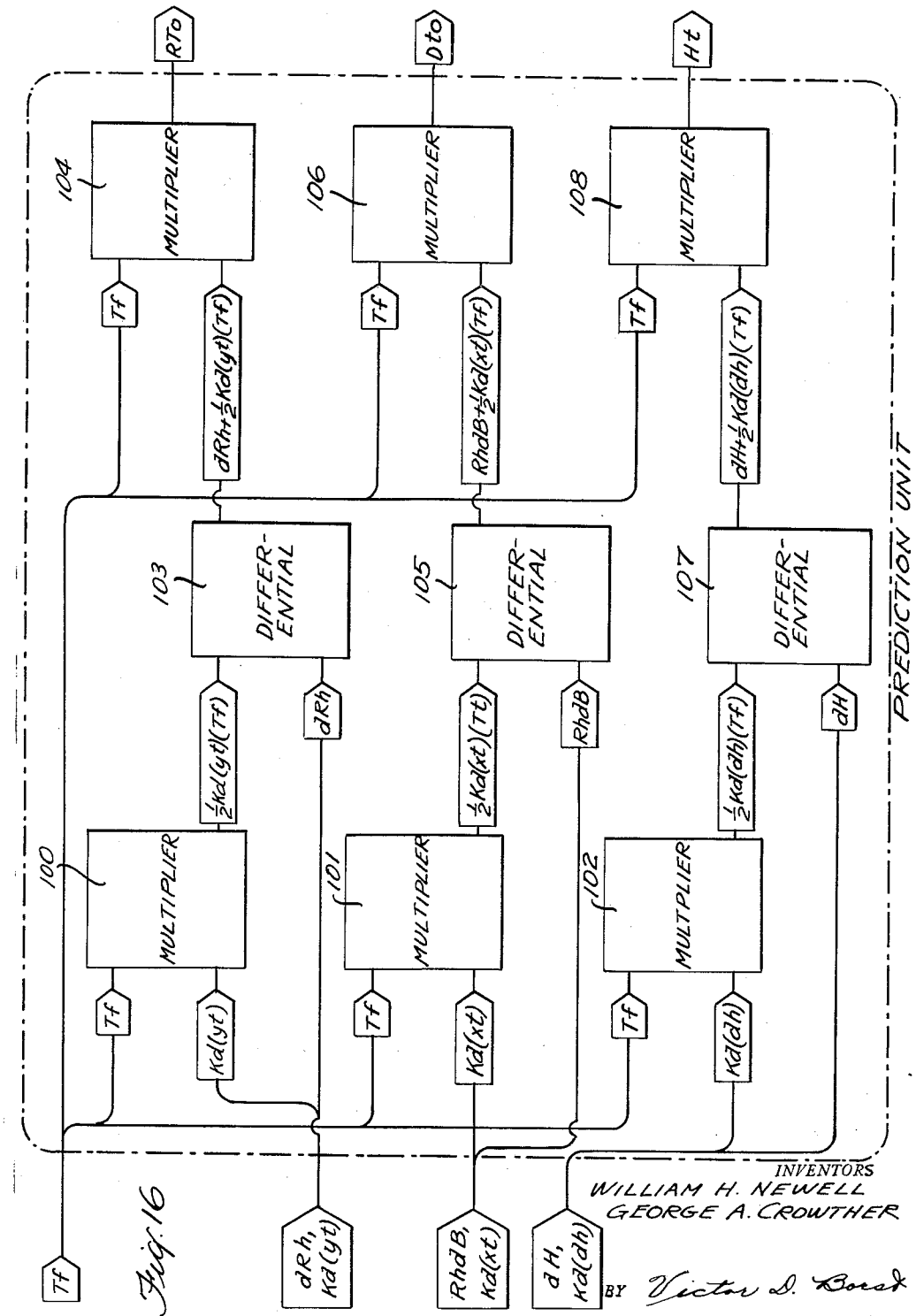

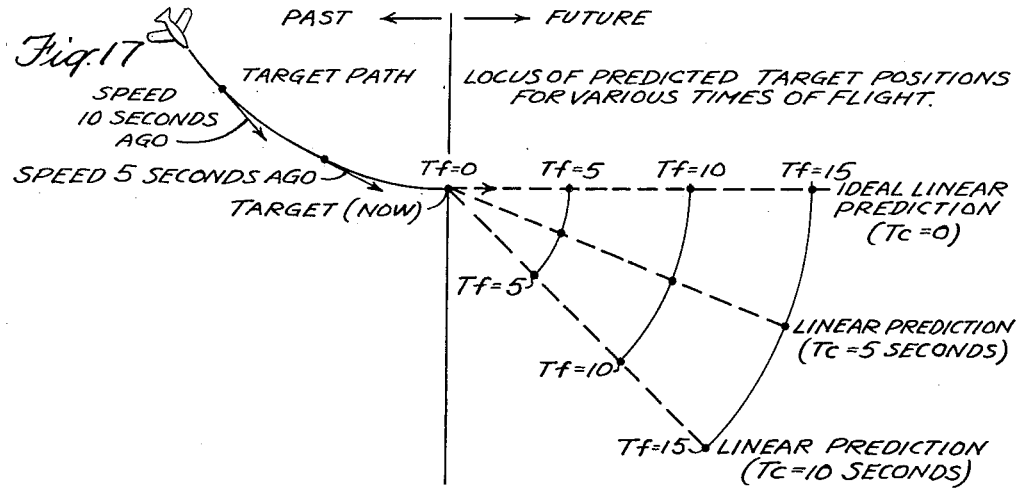
GEOMETRIC ERRORS - LINEAR PREDICTION WITH A CONSTANT TIME CONSTANT.
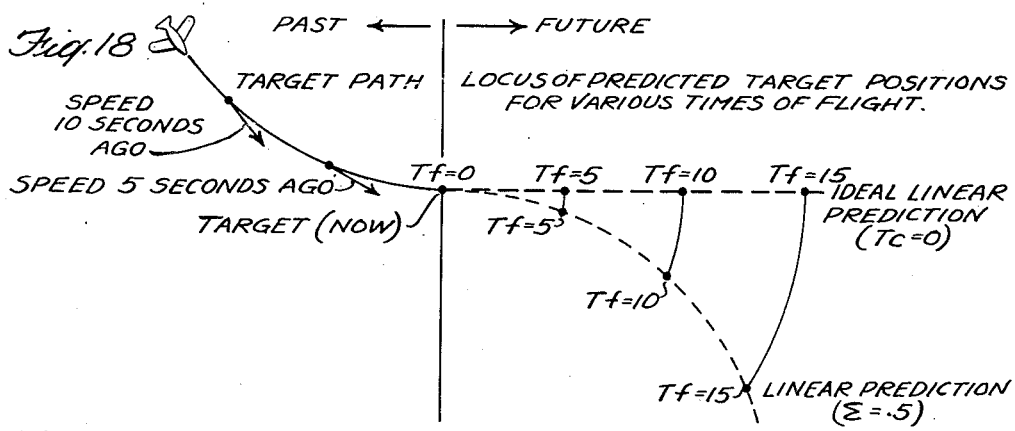
GEOMETRIC ERROR - LINEAR PREDICTION WITH A CONSTANT SIGMA.
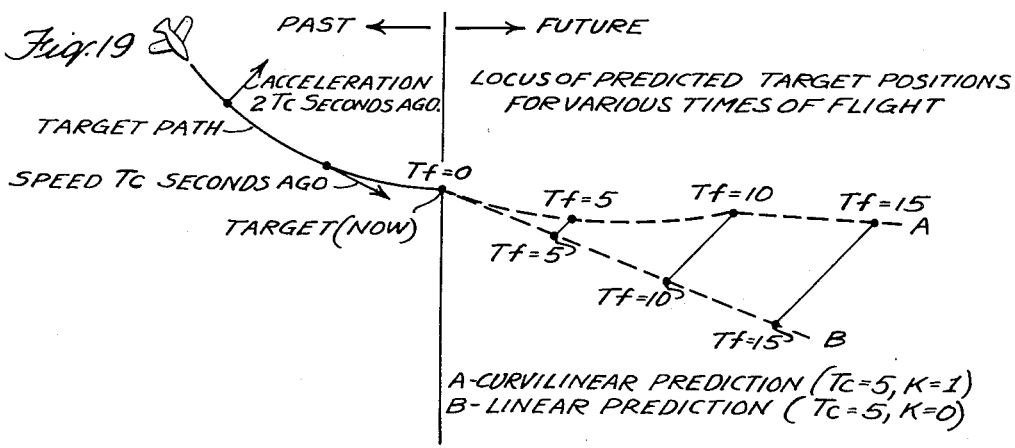
GEOMETRIC ERROR - CURVILINEAR PREDICTION WITH A CONSTANT TIME CONSTANT AND ACCELERATION CONSTANT Aug. 8, 1961  W. H. NEWELL ET AL  2,995,296
TARGET COURSE PREDICTOR
Filed April 22, 1954  13 Sheets-Sheet 13
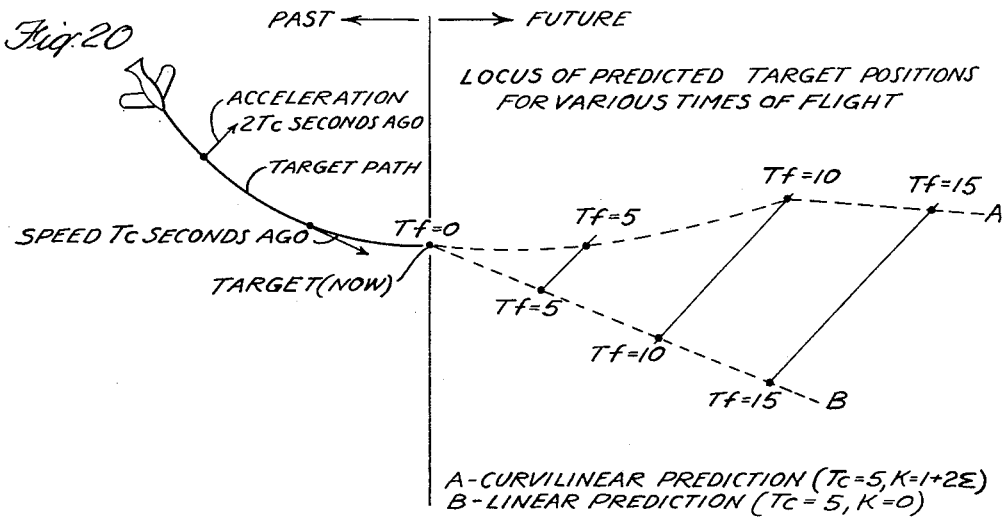
GEOMETRIC ERROR – CURVILINEAR PREDICTION WITH A CONSTANT
TIME CONSTANT AND ACCELERATION CONSTANT EQUAL TO 1+2Σ
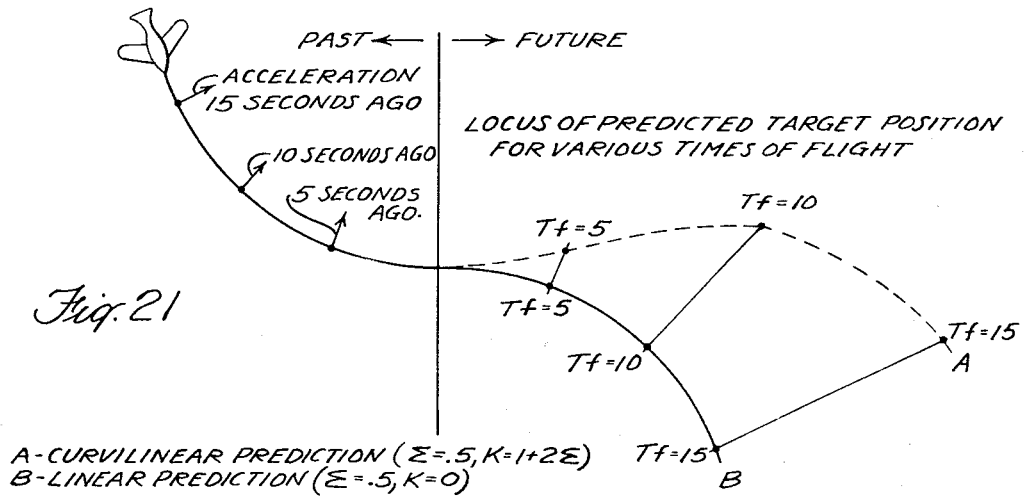
GEOMETRIC ERROR – CURVILINEAR PREDICTION WITH A
CONSTANT Σ AND ACCELERATION CONSTANT EQUAL TO 1+2Σ.

United States Patent Office 2,995,296
Patented Aug. 8, 1961

2,995,296
TARGET COURSE PREDICTOR
William H. Newell, Mount Vernon, and George A. Crowther, Manhasset, N.Y., assignors to Sperry Rand Corporation, a corporation of Delaware
Filed Apr. 22, 1954, Ser. No. 424,814
18 Claims. (Cl. 235—61.5)

The present invention relates to a target course predictor for a gun fire control system and to certain component parts, per se, of said predictor.

A linear predictor in the absence of tracking errors will predict correctly the motion of a target moving with constant linear velocity and a curvilinear predictor in the absence of tracking errors will predict correctly the motion of a target, even when accelerating, as long as the target acceleration along any fixed cartesian coordinate axis is constant. If the target has a changing acceleration, due, for example, to the maneuvering of the target, then it is impossible to foretell exactly what the target will do at some future time. Some intelligent assumptions, therefore, must be made concerning the target's future path, to attain a high incidence of predicting accuracy.

The present data obtained from the director of the gun fire control system for course prediction computations contain a certain amount of "noise" due to tracking irregularities. If this "noise" were ignored, the resulting dispersion would place the projectiles at widely scattered points. For this reason, smoothing must be introduced into the system. If smoothing were applied directly to the present position data, which is usually changing rather fast, the resulting quantities would lag the correct data a considerable amount. For this reason, smoothing is applied in accordance with the present invention, to quantities which do not change very often, namely, to the quantities which change only when the target changes its course or speed.

As the amount of smoothing is increased, the dispersion due to "noise" decreases. However, the geometrical errors (i.e., errors due to target manuvering) introduced by using smoothed rates, increase. In accordance with the present invention, the target's acceleration is assumed to remain constant during the time of flight. This means that if the target has a constant velocity or a constant acceleration, the predictor will predict its future position with practically no error. If, however, the target has a changing acceleration, the predictions are based on a velocity and an acceleration that existed some time in the past depending on the amount of smoothing which is applied to the target rates.

For a given set of conditions (radar, director, computer, target maneuverability, time of flight, etc.) there is some optimum amount of smoothing which will result in the greatest chance of hitting the target.

One object of the present invention is to provide a new and improved target course predictor, which will afford the optimum amount of smoothing under the conditions present, and which will thereby predict automatically the course of a target moving with constant linear velocity, constant acceleration or varying acceleration, with sufficient accuracy to provide a comparatively high probability of hitting the target.

Another object of the present invention is to provide a new and improved target course predictor, sufficiently flexible to solve with a high degree of accuracy the problems presented by various targets and tactical situations.

A further object of the present invention is to provide a new and improved target course predictor operable to permit its use effectively and selectively in connection with a surface target or with an airborne target travelling at high speed and allowing therefore little time for engagement.

Another object of the present invention is to provide a new and improved target course predictor, which can be set up for special operation during the acquisition or initial phase of each engagement, when quick solutions are required, and which is automatically switched-over after a predetermined initial period for steady operations.

A further object of the present invention is to provide new and improved component networks for the curved course predictor of the present invention described.

Another object of the present invention is to provide a new and improve rate control loop, which through the expediency of basically an integrator, a differential and a device for introducing a sensitivity coefficient, determines continuously and accurately smoothed rate values.

In solving the prediction problems of the present invention, various relationships may be obtained between noise errors and geometrical errors by varying a computer time constant $Tc$ applied to the target rates for smoothing. This time constant $Tc$ may be constant or may be controlled to afford a constant sigma equal to $Tc/Tf$, where $Tf$ is the time of flight of the target. To eliminate the lag in the smoothed velocity, an acceleration constant $K$ is employed varying between 0 and 1.4. This $K$ under certain optimum conditions is set to equal $1+2\Sigma$.

Various other objects of the invention are apparent from the following particular description and from inspection of the accompanying drawings, in which:

FIG. 1 is a diagram illustrating the prediction problem involved in the present invention;

FIG. 2 is a diagrammatic view of a basic rate computing loop embodying the present invention;

FIG. 5 is a curve illustrating the frequency response of the electrical circuit of FIG. 4;

FIG. 6 is a curve illustrating the weighting function of the basic rate computing loop of FIG. 2;

FIG. 7 is a curve illustrating the weighting function of the basic rate computing loop of FIG. 2 in combination with an acceleration smoothing network illustrated in FIG. 15;

FIG. 15 is a block diagram of an acceleration smoothing network forming part of the prediction system of the present invention;

FIG. 16 is a block diagram of a prediction unit forming part of the prediction system of the present invention;

FIG. 17 is a diagram illustrating geometric errors encountered with linear prediction involving a constant time constant Tc;

FIG. 18 is a diagram illustrating geometric errors encountered with linear prediction involving a constant sign;

FIG. 19 is a diagram illustrating geometric errors encountered with curvilinear predition involving a constant time constant Tc and constant acceleration constant K;

FIG. 20 is a diagram illustrating geometric errors encountered with curvilinear prediction involving a constant time constant Tc and an acceleration constant equal to $1 + 2\Sigma$;

FIG. 21 is a diagram illustrating geometric errors encountered with curvilinear prediction involving constant $\Sigma$ and acceleration constant equal to $1 + 2\Sigma$.

GLOSSARY OF TERMS

Figure 3:
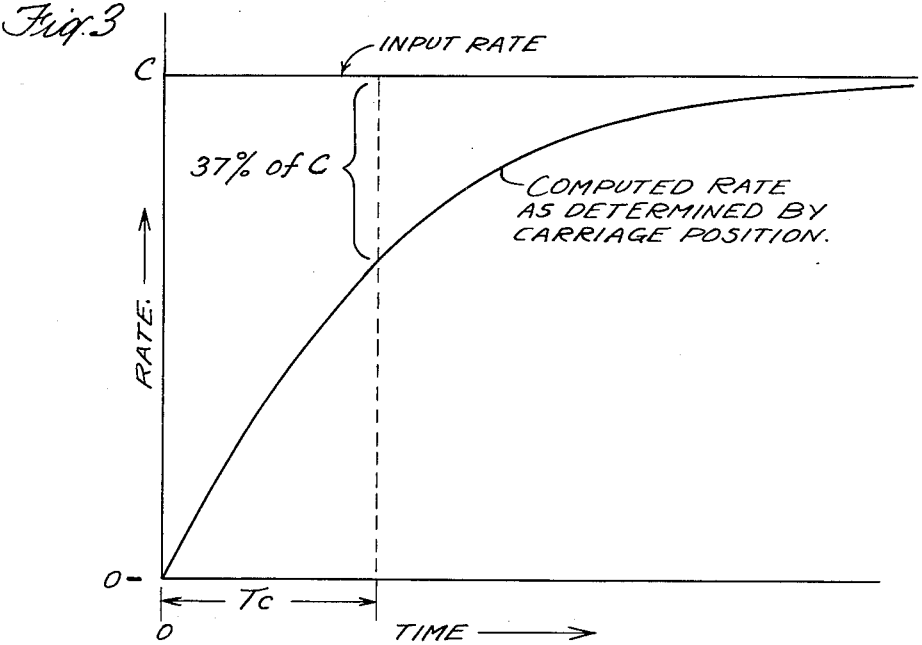
FIG. 3 is a curve showing the relationship of the time constant $Tc$ to the computed rate in the basic rate computing loop of FIG. 2.

Herein is the glossary of terms herein employed, unless otherwise indicated. The glossary is indicated herein in connection with a gun fire control system on a ship but it must be understood that the invention is not limited in certain of its aspects to a system so located.

A—Target angle: Angle between vertical plane through the relative target speed vector, and the vertical plane through the line of sight, measured in the horizontal plane clockwise from the target speed vector.

B—True target bearing: Angle between the north-south vertical plane through the line of sight, measured in the horizontal plane. Positive angles measured clockwise from north.

$B'r$—Director train (stabilized sight): Angle between the vertical plane through own ship centerline, and the vertical plane through the line of sight, measured in the deck plane. Positive angles measured clockwise from own ship centerline.

$Br$—Relative target bearing: Angle between the vertical plane through own ship centerline, and the vertical plane through the line of sight, measured in the horizontal plane. Positive angles measured clockwise from own ship centerline.

$Co$—Own ship course: Angle between the north-south vertical plane, and the vertical plane through own ship speed vector (referred to the plane used by the fire control system), measured in the horizontal plane. Positive angles measured clockwise from north.

$Ct$—Target course: Angle between the north-south vertical plane, and the vertical plane through the target speed vector (referred to the frame used by the fire control system), measured in the horizontal plane. Positive angle measured clockwise from north.

$Dh$—Horizontal deflection prediction: Angle between the vertical plane through the line of sight and the vertical plane through the line of fire, measured in the horizontal plane from the vertical plane through the line of sight.

$Dt$—Sight deflection: The part of sight deflection accounting for relative motion between own ship and target. (The lateral component or the component at right angles to line of sight of target movement during the time of flight.)

$Dto$—Deflection preditions: The horizontal deflection (linear) due to relative motion of ship and target during time of flight.

$d$—When added before a quantity, indicates the differential operator $$\frac{d}{dt}$$

$\Delta$—When added before a quantity, indicates a small change or increment of that quantity.

E—Target elevation or position angle: Angle between the horizontal plane and the line of sight, measured in the vertical plane through the line of sight. Positive angles measured upward from the horizontal plane.

$Eb$—Director elevation: Angle between the deck plane and the line of sight, measured in the vertical plane through the line of sight. Positive angles measured upward from the deck plane.

$Eg$—Vertical gun elevation: Angle between the horizontal plane and the line of fire, measured in the vertical plane through the line of fire. Positive angles measured upward from the horizontal plane.

E2—Future target elevation or ballistic position angle: Angle between the horizontal plane and the line to the future target position, measured in the vertical plane through the line to the future target position. Positive angles measured upward from the horizontal plane.

H—Target height: The height of the target above the horizontal plane measured in the vertical plane through the line of sight $H = R \sin E$.

$dH$—Vertical linear movement or rate of climb: Vertical linear displacement during the time of flight in the vertical plane through the line of sight, due to relative motion between own ship and target in the frame used by the fire control system (vertical component of target velocity).

$d(dh)$—Smoothed vertical acceleration of target.

$Ht$—The vertical component of target movement during the time of flight.

H2—Predicted target height.

K—Acceleration constant.

Q—Sensitivity coefficient: The reciprocal of the rate time constant $Q = 1/Tc$.

R—Present range: The distance from own ship (gun director) to target measured along the line of sight.

$Rh$—Horizontal range: Projection of present range in the horizontal plane by a vertical plane through the line of sight $Rh = R \cos E$.

$Rt$—Range spot: The difference between present range and future range (the horizontal line of sight component of target movement during the time of flight).

$Rto$—Range prediction: The horizontal range component of the relative motion of ship and target during time of flight.

R2—Advance or ballistic range: The distance from own ship to the advance position measured along the line to the advance position.

$Sh$—Horizontal angular movement or target speed: Angle between the vertical plane through the line of sight, and the vertical plane through the line to the future target position, measured in the horizontal plane from the vertical plane through the line of sight.

$So$—Linear movement in horizontal or ship speed: The linear displacement during the time of flight in the horizontal plane and in the vertical plane through the relative target speed vector in the frame used by the fire control system (due to own ship motion).

$Sw$—Horizontal true wind speed: The rate of the true wind in the horizontal plane and in the vertical plane through the total true wind speed vector, measured with respect to the earth.

$\Sigma$—Sigma: $\Sigma = Tc/Tf$.

T—Time: Clock time.

Tc—Computer time constant: The time in seconds for an error in the computation of a rate to decay to $1/e$ of its original value, where $e$ is the base of natural logarithms.

$Td$—Delay time: The time in seconds between present computed data and the past input data that corresponds with the present computed data.

$Tf$—Time of flight: The time of flight of the projectile to the future target position.

$Xo$—Linear movement in bearing: The linear displacement during the time of flight in the horizontal plane perpendicular to the vertical plane through the line of sight, resulting from relative motion between own ship and target in the frame used by the fire control system (the lateral component of ship motion or relative wind, measured perpendicular to the line of sight), $$Xo = So \sin Br$$

$Xt$—Linear movement in bearing: The linear displacement during the time of flight in the horizontal plane perpendicular to the vertical plane through the line of sight, resulting from relative motion between own ship and target in the frame used by the fire control system (the lateral component of target velocity, measured perpendicular to the line of sight) $Xt = \Delta Xt + jXt$.

$\Delta Xt$—The operated lateral component of target velocity due to changes in target bearing.

$jXt$—Correction to $\Delta Xt$ for changes in target speed or course.

$d(xt)$—Smoothed lateral acceleration of target relative to the line of sight.

$Yo$—Linear movement in bearing: The linear displacement during the time of flight in the horizontal plane and in the vertical plane through the line of sight, due to relative motion, between own ship and target in the frame used by the fire control system (the horizontal line of sight component of ship motion or relative wind), $$Yo = -So \cos Br$$

$Yt$—Linear movement in horizontal range: The linear movement during the time of flight in the horizontal plane and in the vertical plane through the line of sight, due to relative motion, between own ship and target in the frame used by the fire control system (the horizontal line of sight component of target velocity), $Yt = \Delta Yt + jYt$.

$\Delta Yt$—The generated line of sight component of target velocity due to changes in target bearing.

$jYt$—Correction to $\Delta Yt$ for changes in target course or speed.

$d(yt)$—Smoothed horizontal acceleration of target in plane of sight.

In the system of the present invention, the target is predicted to travel either along a straight line, along a parabola line or along any one of a family of courses between said lines, depending upon the "K" setting (acceleration constant) of the system. Prediction is based upon the linear velocity and acceleration of the target, as determined from the components of acceleration measured along and perpendicular to the present line of sight. It is assumed that the target will retain its present acceleration for 10 seconds, and that target velocity will vary from the present value according to the assumed constant acceleration. After 10 seconds, the target velocity is assumed to be constant.

Perturbations are generally present in the target data supplied by the director, due to tracking irregularities. With no smoothing, the target velocity and acceleration computed from these data would contain greatly amplified perturbations creating so-called "noise" errors. If these noise were ignored, the resulting dispersion would place the target at widely scattered points. Consequently, smoothing is introduced into the system. The smoothing, as will be more fully described, will be of the exponential second derivative type.

EQUATIONS INVOLVED IN THE PREDICTION PROBLEM

It can be shown that in order to obtain double exponential smoothing of second derivative values, the smoothed accelerations must satisfy the differential equations $$Qd(xt) = Qd(jXt) - d(dxt) - dB(dyt) \quad (1)$$

$$Qd(yt) = Qd(jYt) - d(dyt) + dB(dxt) \quad (2)$$

$$Qd(dh) = Qd(dH) - d^2(dh) \quad (3)$$

These equations are solved for the smoothed lateral acceleration $(dxt)$, the smoothed horizontal acceleration $(dyt)$ and the smoothed vertical acceleration $d(dh)$ in an acceleration smoothing network shown in FIG. 15. In these formulas, the rate of change of the acceleration terms $d(dxt)$, $d(dyt)$ and $d^2(dh)$ contribute the smoothing. The terms $dB(dyt)$ and $dB(dxt)$ compensate for changes in the acceleration components $(dxt)$ and $(dyt)$ respectively, due to the changing position of the line of sight.

Dividers in the acceleration smoothing network remove the sensitivity coefficient Q appearing before each acceleration quantity in the above equations. Subsequently, the smoothed accelerations are multiplied by K, to obtain outputs to a prediction unit (FIG. 16).

A prediction network including the prediction unit of FIG. 16 predicts what the target path will be depending upon the value of K introduced in the acceleration smoothing network (FIG. 15) and predicts where the target will be $Tf$ seconds in the future, $Tf$ being the time required for a projectile, fired at the present moment, to reach this future target position. After this point is located, the prediction network transforms this information into useable dimensions.

As will be more fully described, the value of K introduces compensation for the inherent delay time of the linear rates network. This delay in a rate solution results whenever the target changes course or speed and corresponds to a time in the past when the true rates had the same values as the present computed rates, assuming constant acceleration.

As already described, predictions are based on the assumption that the target will retain its present acceleration for ten seconds and that during this time its instantaneous velocity will vary from its present velocity according to this assumed constant acceleration. For any value of $Tf$ less than ten seconds, the instantaneous future horizontal range rate of target movement will therefore be the algebraic sum of its present range rate $(yt)$ and of its present range acceleration $dyt$ multiplied by $Tf$, or $Yt + (dyt)Tf$. During this time, the average rate will be $Yt + \tfrac{1}{2}(dyt)Tf$.

The horizontal range distance $(Rt)$ traveled by the target during $Tf$ is the product of its average range rate and $Tf$ or $$Rt = (Yt)(Tf) + \tfrac{1}{2}Kd(yt)Tf^2$$

In like manner, expressions may be derived for the deflection $Dt$ and height $Ht$ components of target movement.

The range $(Rt)$, deflection $(Dt)$ and height $(Ht)$ predictions to compensate for target movement during the time of flight are shown in FIG. 1. When $Tf$ is less than ten seconds, the target motion predictions are based on the following equations, which are equation of parabolas:

$$Rt = (Yt)(Tf) + \tfrac{1}{2}Kd(yt)(Tf)^2 \quad (4)$$

$$Dt = (Xt)(Tf) + \tfrac{1}{2}Kd(xt)(Tf)^2 \quad (5)$$

$$Ht = (dH)(Tf) = \tfrac{1}{2}Kd(dh)(Tf)^2 \quad (6)$$

The expressions for the range $Ro$ and deflection $Do$ corrections to compensate for gun motion (exclusive of relative wind) are as follows:

$$Ro = (Yo)(Tf) \quad (7)$$

$$Do = (Xo)(Tf) \quad (8)$$

If Equations 7 and 14 are combined, a single equation for the target motion range prediction $Rt$ and the range effect of gun motion $Ro$ can be obtained as follows:

$$Rt + Ro = (Yo + Yt)(Tf) + \tfrac{1}{2}Kd(yt)(Tf)^2$$

If $Rto$ is substituted for $(Rt + Ro)$ and $dRh$ for $(Yo + Yt)$, the following expression for $Rto$ may be obtained:

$$Rto = (dRh)(Tf) + \tfrac{1}{2}Kd(yt)(Tf)^2 \quad (9)$$

Similarly, the deflection correction for gun motion $(Do)$ (Equation 8) and the deflection prediction for target motion (D$t$) (Equation 5) may be combined to give the following expression for (D$to$):

$$Dto = (RhdB)(Tf) + \tfrac{1}{2}Kd(xt)(Tf)^2 \qquad (10)$$

The prediction unit (FIG. 16) computes R$to$, D$to$, and H$t$ according to Equations 9, 10 and 6 respectively.

The outputs of the prediction unit FIG. 16 are combined with other quantities to form the required ballistic range R2, ballistic position angle E2, vertical gun elevation E$g$, and horizontal deflection D$h$.

QUANTITIES REQUIRED FOR SOLUTION OF PREDICTION PROBLEM

From Equations 1, 2, 3, 6, 9 and 10, it is apparent that to solve the prediction problem, it is necessary to compute the following quantities: $d$B, R$h$$d$B, R$h$, X$t$, Q$d$($j$X$t$), $d$H, Q$d$($d$H), Y$t$, Q$d$$j$Y$t$, $d$R$h$ and Q.

Position angle E, i.e. the angle between the line of sight and the horizontal plane, measured in a vertical plane, is combined in a resolver with the present range R from the gun director to form the horizontal range R$h$ and height H according to the following equations $$Rh = R \cos E$$
$$H = R \sin E$$

The quantity R is therefore required and the quantity E needs to be computed to solve the prediction problem. Further equations to be mechanized for solution of the prediction problem are as follows:

$$RhdB - Xo = Xt \qquad (11)$$
$$dRh - Yo = Yt \qquad (12)$$

where R$h$$d$B is the linear deflection rate, X$o$ is the lateral component of ship motion or relative wind, measured perpendicular to the line of sight and Y$o$ is the horizontal line of sight component of ship motion or relative wind. The quantities X$o$ and Y$o$, therefore, must be rendered continuously available for solution of the prediction problem.

Figure 8:
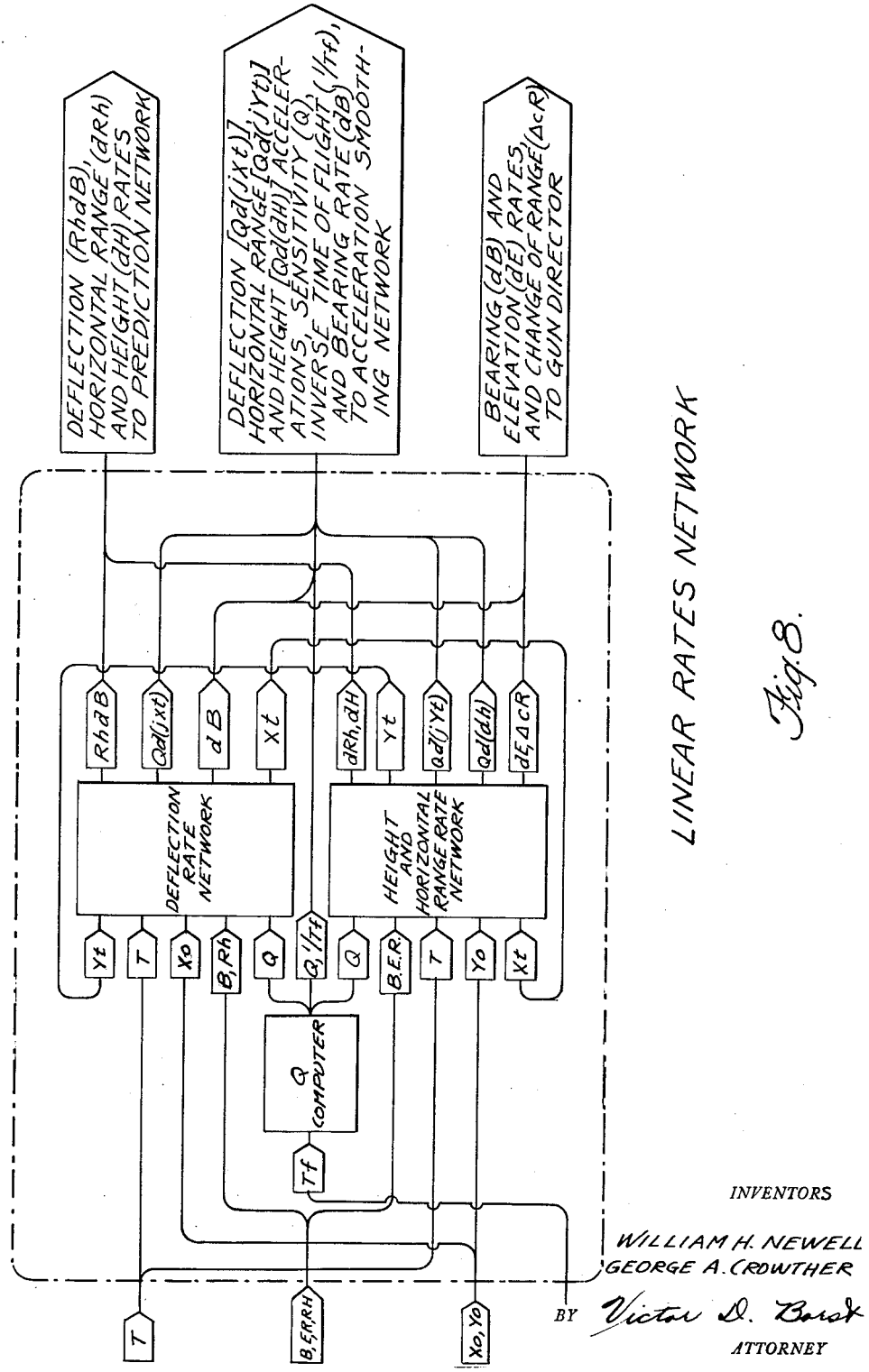
FIG. 8 is a block diagram of a linear rates network forming part of the prediction system of the present invention.

The present position network is not shown but this network converts the polar coordinates B'$r$, E$b$ and R obtained from the gun director into a stable system of polar coordinates B, E and R$h$ whose values do not change with the rolling, pitching and changes in course of own ship and supplies these converted quantities as inputs into linear rates network shown in FIG. 8. B'$r$ is the director train, or the angle between the vertical plane through the ship's centerline and the vertical plane through the line of sight, measured in the deck plane clockwise from the bow; E$b$ is the director elevation or the angle between the line of sight and the deck plane, measured in the vertical plane through the line of sight; R is the present target range or the distance from the gun director to the target. B is the true target bearing or the angle between true north and the vertical plane through the line of sight, measured in the horizontal plane clockwise from true north; E is the position angle or the angle between the line of sight and the horizontal plane, measured in a vertical plane; and R$h$ is the horizontal range equal to R cos E.

The apparent wind network which is also not shown, supplies to the linear rates network, the components of own ship velocity, X$o$ and Y$o$.

One of the networks employed in the target predicting system of the present invention is the linear rates network (FIG. 8) which computes the values of some of the quantities in Equations 1, 2 and 3 and makes them available to the acceleration smoothing network (FIG. 15) and to the prediction unit (FIG. 16). This linear rates network takes input B, E, R, R$h$ from the present position network (not shown), X$o$ and Y$o$ from the apparent wind network (not shown) and T$f$ from the ballistic network (not shown), and from these inputs computes for the acceleration smoothing network (FIG. 15) and prediction unit (FIG. 16), the quantities $d$B, time rate change of the true bearing of the target; R$h$$d$B, the linear deflection rate of the target which is the product of the present horizontal target range R$h$ and the time rate of change of the present true bearing $d$B; X$t$, the lateral component of the present target velocity measured perpendicular to the line of sight; Q$d$($j$X$t$), the deflection component of target acceleration, the quantity Q being the sensitivity constant and the reciprocal of the rate time constant T$c$, to be more fully described; $d$H, the rate of climb or vertical component of target velocity; Q$d$($d$H), the component of vertical acceleration of the target; Y$t$, the horizontal line of sight component of target velocity; Q$d$($j$Y$t$), the horizontal target range acceleration; $d$R$h$, the rate of change of horizontal target range; Q, the sensitivity constant; and $$\frac{1}{Tf}$$

the reciprocal of the time of flight which is the time required for a projectile fired at the present time to reach the future target position.

The output quantities Q$d$($j$X$t$), Q$d$($j$Y$t$), Q$d$($d$H), Q, $$\frac{1}{Tf}$$

and $d$B from the linear rates network (FIG. 8) are received in the acceleration smoothing network (FIG. 15) to solve Equations 1, 2 and 3. This latter network computes from these quantities, smoothed acceleration components of target motion relative to the line of sight. As already pointed out, the specific quantities computed by the acceleration smoothing network are K$d$$x$$t$, the product of the acceleration constant K and the smoothed lateral acceleration of target relative to the line of sight; K$d$($d$$h$), the product of the acceleration constant K and the smoothed vertical acceleration of the target; and K$d$($y$$t$), the product of the acceleration constant K and the smoothed horizontal acceleration of target in the plane of sight. The K constant in the above quantities has the effect of compensating for the time delay T$d$ of the linear rates network. This time delay T$d$ is the time in seconds between the present computed data and the past input data that corresponds with the present computed data assuming constant acceleration for the future prediction period. This delay in a rate solution results whenever the target changes course or speed.

The linear rates network smooths invariant rates, that is, rates which do not vary with time providing the target moves at a constant speed along a straight path. This type of smoothing has the advantage of minimizing the rate errors. Since invariant rates change slowly or not at all, the time delay inherent in smoothing has small effect on the accuracy of rate computations.

RATE COMPUTING LOOP

One of the rate computing loops employed in the linear rates network is illustrated in basic form in FIG. 2 for the computation, for example, of angular bearing rate $d$B$c$. This loop utilizes a mechanical integrator of the well-known type arranged in a loop circuit, so that it operates as a differentiator. This mechanical integrator is shown of the well-known mechanical disc type. In this description, the letter "c" will be used to distinguish computed quantities from inputs. A time motor (not shown) drives the integrator disc 10 at a constant speed, so that the revolutions of the disc represent time (T). A differential 11 compares the output ΔcB of the integrator roller 12 with the target bearing B whose rate is to be computed. The difference $j$B between B and ΔcB turns a gearing 13 of ratio Q. The output of this gearing 13 connects with the integrator carriage 14, and moves the carriage so as to reduce the difference. It will be shown that the position $d$B$c$ of the carriage 14 closely represents the rate of change of B.

Since the disc 10 of the integrator is driven at constant speed, the speed of its roller 12 is proportional to the displacement of its carriage 14 from the center of the disc. Expressed mathematically, $$d(\Delta cB) = dBc$$

where $\Delta cB$ is the roller output and $d$ is the differential operator $d/dT$. The constant proportionality has been omitted for simplicity. Integrating this equation, $$\Delta cB = \int dBc$$

This is the mathematical expression for the roller output. Difference $jB$, computed at the differential output, is defined by the relation:

$$jB = B - \Delta cB - \int dBc$$

Gear ratio Q establishes the relation:

$$dBc = QjB = QB - Q\int dBc \qquad (13)$$

Differentiating Equation 13 with respect to time, to express it in more convenient form, $$d^2Bc = QdB - QdBc$$

Solving for $dBc$, $$dBc = dB - \frac{1}{Q}(d^2Bc) \qquad (14)$$

Equation 14 shows that if Q is very large, $dBc$ very nearly equals $dB$. Q is commonly called the sensitivity since it is a measure of the sensitiveness of $dBc$ to changes in $dB$.

The error in $dBc$, the computed bearing rate, is shown by Equation 14 to be:

$$\text{Error in } dBc = -\frac{1}{Q}d^2Bc$$

The error is proportional to the rate of change of $dBc$, that is, the rate of movement of the integrator carriage 14 (FIG. 2). Compensation is made for this error by computing a correction $+1/Q(d^2Bc)$ in the acceleration smoothing network (FIG. 15) and adding this correction to the acceleration term used in parabolic prediction. Equations 1, 2 and 3 solved in the acceleration smoothing network (FIG. 15) involve this compensation.

*Time constant.*—The reciprocal of Q is the time constant Tc, which is the time required for the rate error to decrease to 37% of its initial value under the following condition: At an initial time when $dBc$ is correct, $dB$ changes instantaneously from one value to another, and remains at the second value thereafter.

The relation:

$$Tc = \frac{1}{Q}$$

may be demonstrated as follows: Assume the conditions shown in FIG. 3. The true rate shown by the heavy lines varies as a step function of time. At T equal to zero, $dB$ changes instantaneously from zero to a constant value, C. Also at T equal to zero, $dBc$ is zero, which means that the integrator carriage 14 (FIG. 2) is at the center of the disc 10. Then, for all values of T greater than zero, Equation 14 can be rewritten:

$$dBc = C - \frac{1}{Q}(d^2Bc)$$

This linear differential equation has for its solution under the assumed initial conditions.

$$dBc = C(1 - e^{-Qt})$$

where $e$ is 2.7183 . . . the base of natural logarithms. When T equals $1/Q$, $$dBc = C(1 - e^{-1})$$

or, since $e$ equals 2.7183, $$dBc = 63\% \text{ of } C$$

and $$\text{Error in } dBc = 37\% \text{ of } C$$

Hence, by definition, Tc equals $1/Q$.

Since the computer has provision for setting and indicating Tc rather than Q, Tc will be used in the remaining description in place of $1/Q$. From the foregoing it may be evident that Tc is a measure of the time required to obtain a rate solution. It also is a measure of the amount of smoothing introduced in the rate networks.

The integrator loops that compute bearing, elevation, and range rates are designed for data smoothing as well as rate computing. This feature is necessary to obtain smooth gun orders.

Target position data may contain minor perturbations due to imperfect tracking as already described. These in turn may be so magnified in the prediction computations that they cause undue roughness in gun orders. For example, assume an input:

$$B = C'T + A \sin wT$$

where $C'T$ represents true target bearing as a function of time, and $A \sin wT$ represents a perturbation of amplitude A and angular frequency $w$. Also, assume that the predicted change D in B is simply $dB(Tf)$.

Then, $$D = C'Tf + (wA \cos wT)Tf \qquad (15)$$

Note that the resulting perturbation in D is $Tf(w)$ times as large as $A \sin wT$. For this reason, it is necessary to smooth either the present position data or the computed rates and accelerations, or both.

The computer smooths the computed rates, and accelerations. Since smoothing usually introduces a time delay, smoothing is used only where essential; that is, where perturbations of input data are most likely to cause perturbations of the computed outputs.

Figure 4:
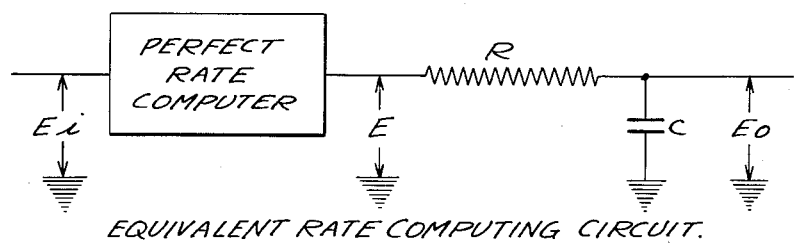
FIG. 4 is a diagrammatic view of an electrical circuit which is the equivalent of the basic rate computing loop of FIG. 2.

*Smoothing action of basic rate computing loop.*—The basic loop (FIG. 2) is analagous to the electrical network shown in FIG. 4, which consists of a perfect rate computer followed by an RC filter, where Ei corresponds to B
E corresponds to $dB$
Eo corresponds to $dBc$
RC corresponds to Tc Smoothing takes place in the RC filter which has the frequency characteristic shown in the curve of FIG. 5, the abscissa of which is on a logarithmetic scale. High frequency variations of B, which may be perturbations, are attenuated while low frequency variations of B due to normal changes in target data, are passed with little attenuation. Increasing Tc causes increased attenuation, predominately at the higher frequencies. Therefore, the amount of smoothing is proportional to Tc.

Since the amplitude of perturbations in prediction (Equation 15) is proportional to $Tf$, the necessary amount of smoothing is also proportional to $Tf$. Accordingly, Tc is made proportional to $Tf$ for constant sigma $\Sigma$ operation, where sigma $\Sigma$ is defined as Tc $/Tf$.

*Weighting function.*—The filtering or smoothing action of the rate computing loop can be expressed in terms of its transient response (FIG. 3), its frequency response (FIG. 5), or its weighting function (FIG. 6), all of which are interdependent. The weighting function expresses the "memory" of the loop. It indicates the extent by which past input data affect present computations. For the rate computing loop, the weighting function (FIG. 6) has the form of a single exponential curve. A change in input at any past time has an effect, or weight, on the present computed rate that is expressed by the ordinate of the curve for that past time. The curve shows that recent data are weighed most heavily.

The acceleration smoothing network (FIG. 15) of itself produces the same smoothing action as the rate computing loop of FIG. 2. However, with respect to the input data B, true target bearing, E, the position angle, and R, the range, two smoothing actions are involved in the computation of accelerations. The first smoothing action takes place in the rate computing loop and the second smoothing action takes place in the acceleration smoothing network. The weighting function that characterizes the overall acceleration smoothing is therefore represented by a double exponential curve (FIG. 7).

*Delay time.*—Because present computed rates are affected by past data, the present computed rates do not correspond with the present input data but may equal instead the true rate values that existed some time in the past. Whenever the target rate *jXt, jYt* and *jdH* are changing, there is a time lag in the computation of these rates. *jXt* is the correction due to changes in target speed or course in ΔXt, the generated lateral component of target bearing; *jYt* is the correction due to changes in target speed or course in ΔYt, the generated line of sight component of target velocity due to changes in target bearing and *jdH* is the correction due to changes in target speed or course in ΔdH, the generated vertical component of target velocity due to changes in target bearing. If these rates *jXt, jYt* and *jdh* are changing uniformly (i.e. the target has constant acceleration), the time between the present moment and that instant in the past when the true rates were equal to the present computed rates, is known as the delay time T$d$. Mathematically, T$d$ is the abscissa of the centroid of the area under the weighting function curve (FIG. 6). For the rate computing loop therefore, $$Td = Tc$$

However, the computed rates are brought up to date by the addition of rate corrections in the acceleration smoothing network.

For the acceleration smoothing network (FIG. 15), T$d$ is defined as the time delay in the computation of accelerations [$d(xt), d(yt)$, and $d(dh)$] if the target has a constant rate of change of acceleration. The value of T$d$ for the acceleration smoothing network has the following relation to the value of T$c$ for the rate computing loops, as shown in FIG. 7

$$Td = 2Tc$$

Unlike rates, no corrections are made to bring the computed accelerations up to date. The computed accelerations, therefore, approximate the true values that existed 2T$c$ seconds in the past.

Figure 14:
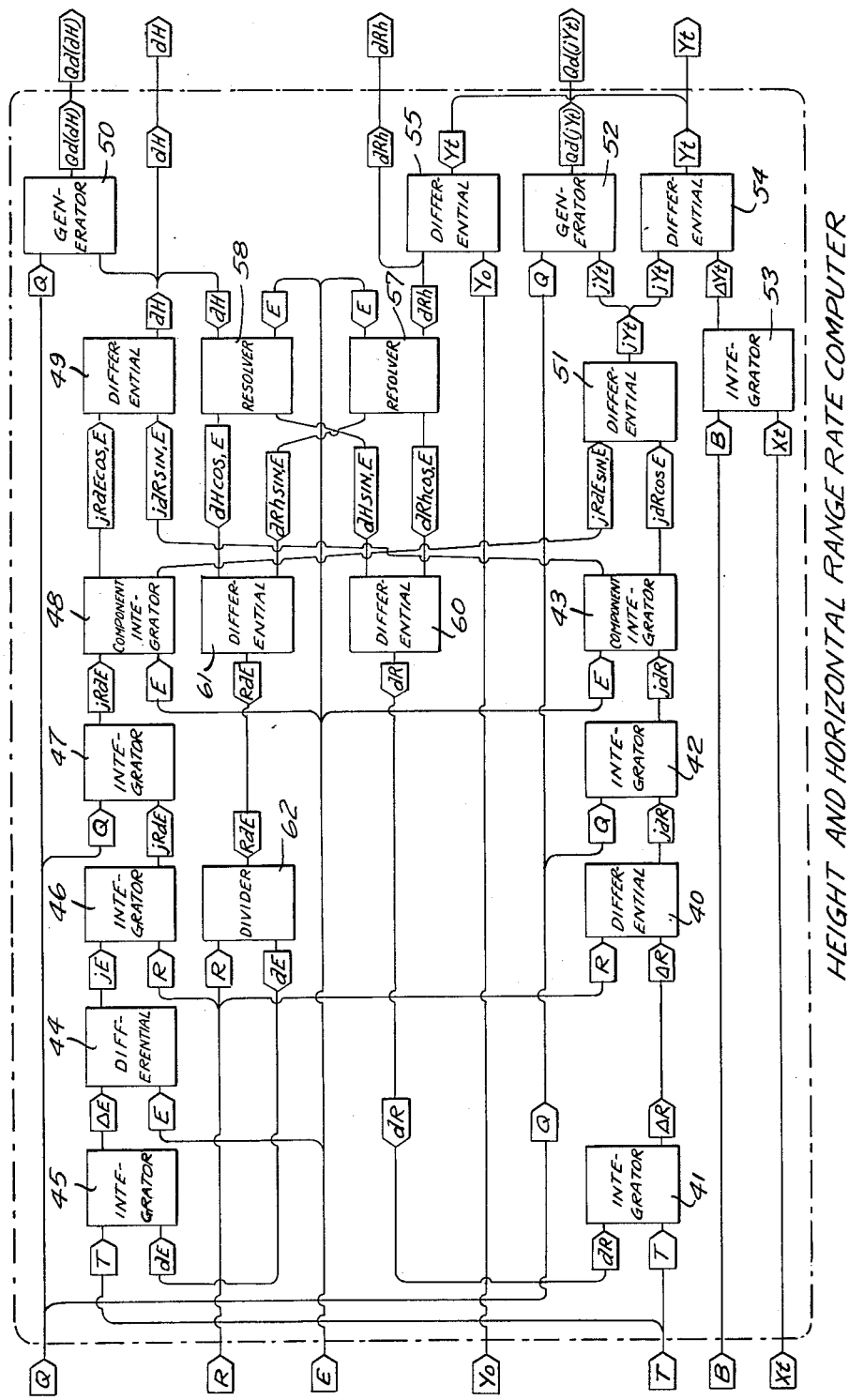
FIG. 14 is a block diagram of a height and horizontal range rate computer constituting part of the linear rates network shown in FIG. 8.

FIG. 8 shows the linear rates network in block diagrammatic form. The major units of this linear rates network are the Q computer (FIG. 9), the deflection rate computer (FIGS. 10 and 11) and the height and horizontal range computer (FIG. 14).

"Q" COMPUTER

As was previously pointed out, the "Q" computer is one of the major units of the linear rates network. This Q computer shown in FIG. 9 receives an input of time of flight T$f$ and from this furnishes an output Q. As already indicated, the computer sensitivity Q is the reciprocal of the time constant T$c$ (smoothing delay time) of the linear rate network, where T$c$ is the time required for the error to decrease to 37% of its initial value. The time constant T$c$ may be determined either manually or automatically. When T$c$ is adjusted manually, it may be limited, for example, to values between 1 second and 20 seconds for anti-aircraft control and between 5 seconds and 100 seconds for surface control.

To provide adequate smoothing with the least time delay, the time constant of the network is controlled automatically. It can be varied in proportion to time of flight T$f$ (constant Σ operation where $$\Sigma = \frac{Tc}{Tf})$$

or it can be set at a fixed optimum value (constant Q operation). During the first few seconds of tracking, the time constant is automatically reduced to obtain a quick solution.

In the Q computer (FIG. 9), the value of T$f$ obtained from the ballistic network (not shown) is converted into its reciprocal 1/T$f$ by a non-linear potentiometer 19. For anti-aircraft control, Q is computed to maintain a constant sigma by two potentiometers 20 and 21 and to obtain a low-valued initial sigma and a high-valued steady state sigma under constant sigma conditions. The potentiometer 20 used during the initial tracking period, is adjustable, for example, to a lower limit of 0.1 sigma. The other potentiometer 21, used thereafter, can be separately adjusted, for example, to a lower limit of 0.1 sigma, although it is intended that the steady state sigma shall be four times the initial sigma. An adjustable time delay relay 22, controlled by the director switch (not shown) which controls the computer time motors, determines the time of transfer from initial to steady state sigma. If this time switch is open, the relay 22 connects the Q line to obtain a low-valued sigma. Closing the switch changes the connection, after a few seconds delay, to obtain a high valued sigma to control the linear rates network.

Also, for anti-aircraft control, a potentiometer 23 is provided to maintain a constant T$c$, the value of which is determined by adjustment.

For surface control, Q is computed by a potentiometer 24 to maintain a constant sigma, adjustable, for example, to a lower limit of 0.2.

A hand selector switch 25 permits selection between a Q with constant sigma and a Q with constant T$c$ and a control switch 26 permits selective setting for an anti-aircraft Q or for a surface Q.

DEFLECTION RATE COMPUTER

Figure 9:
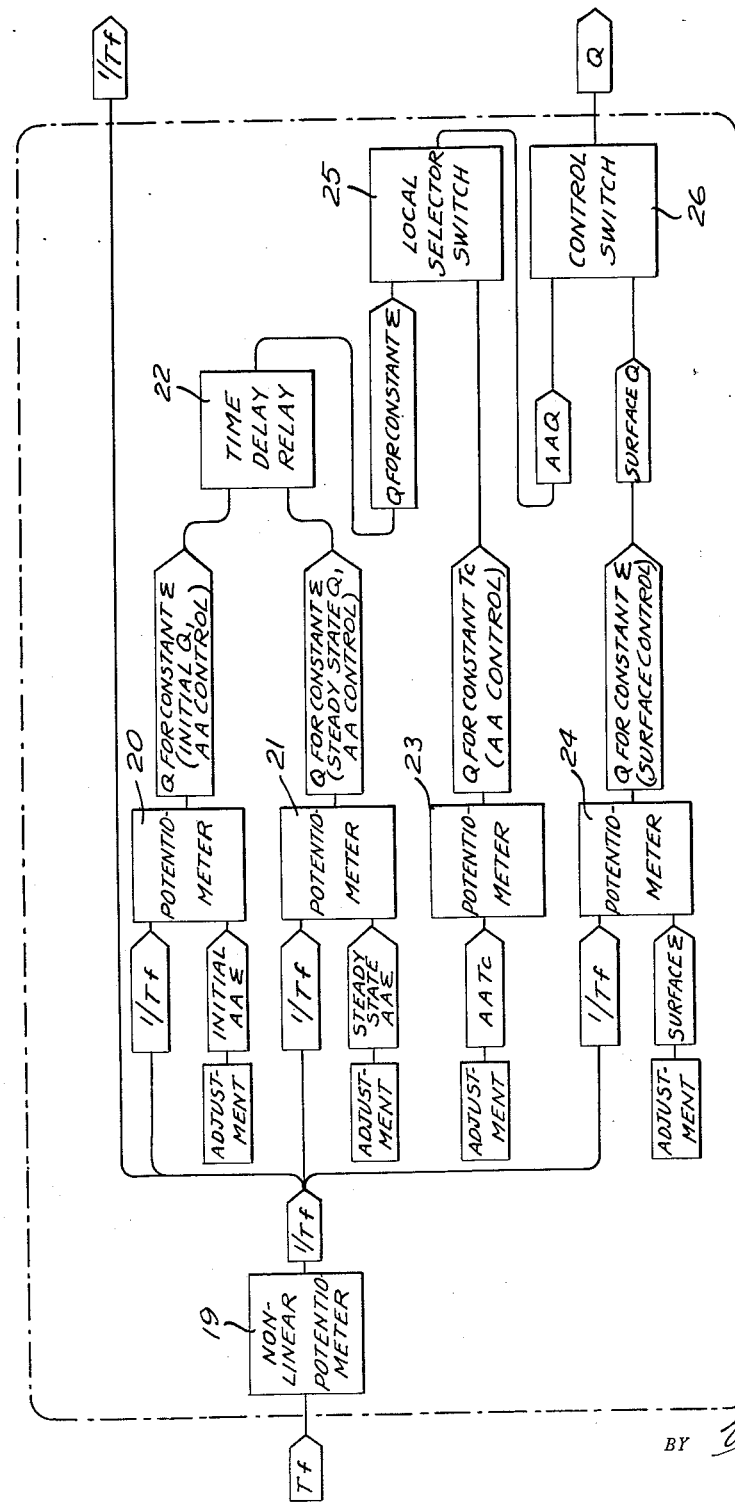
FIG. 9 is a block diagram of a "Q" computer constituting part of the linear rates network shown in FIG 8.
Figure 10:
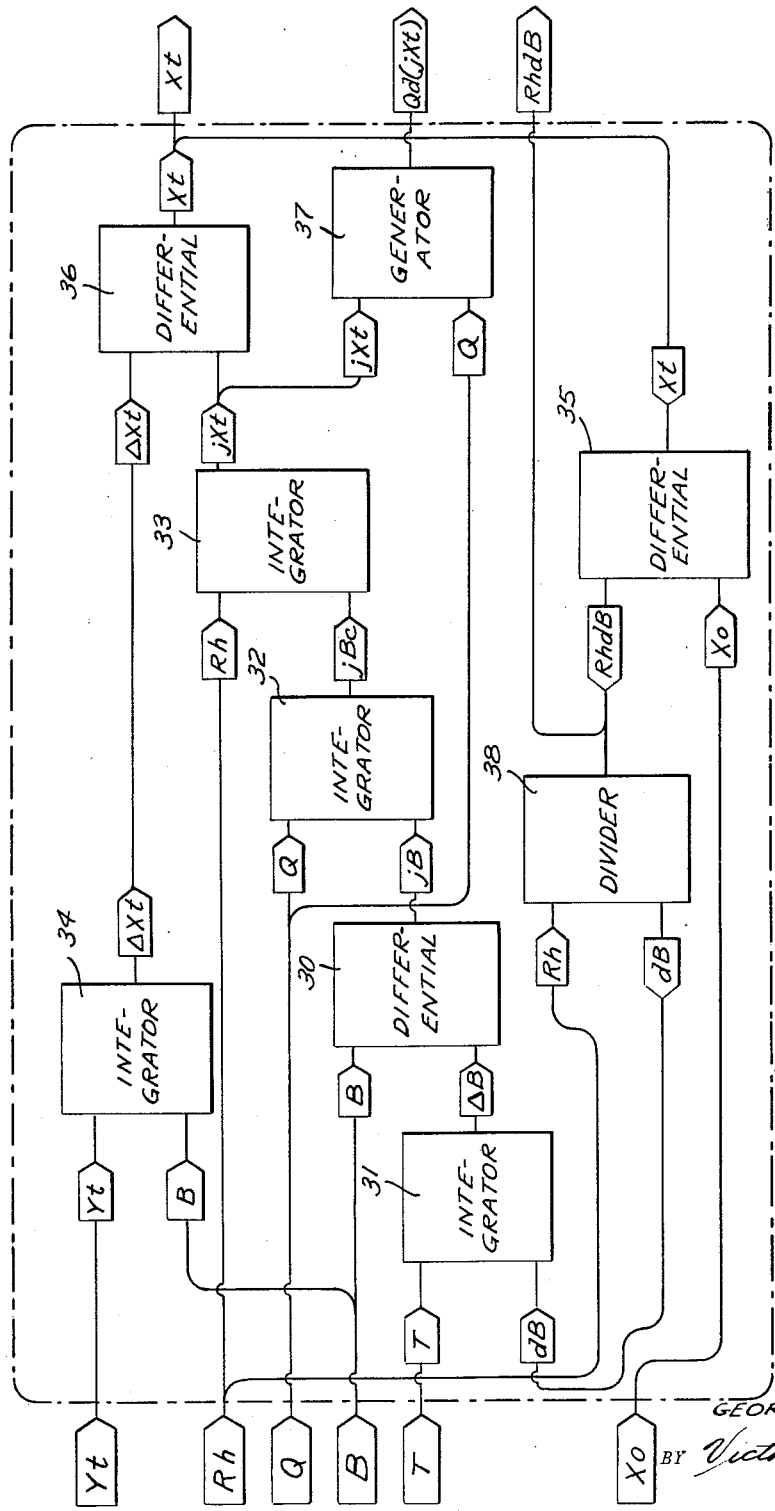
FIG. 10 is a block diagram of a deflection rate computer constituting part of the linear rates network shown in FIG. 8.
Figure 11:
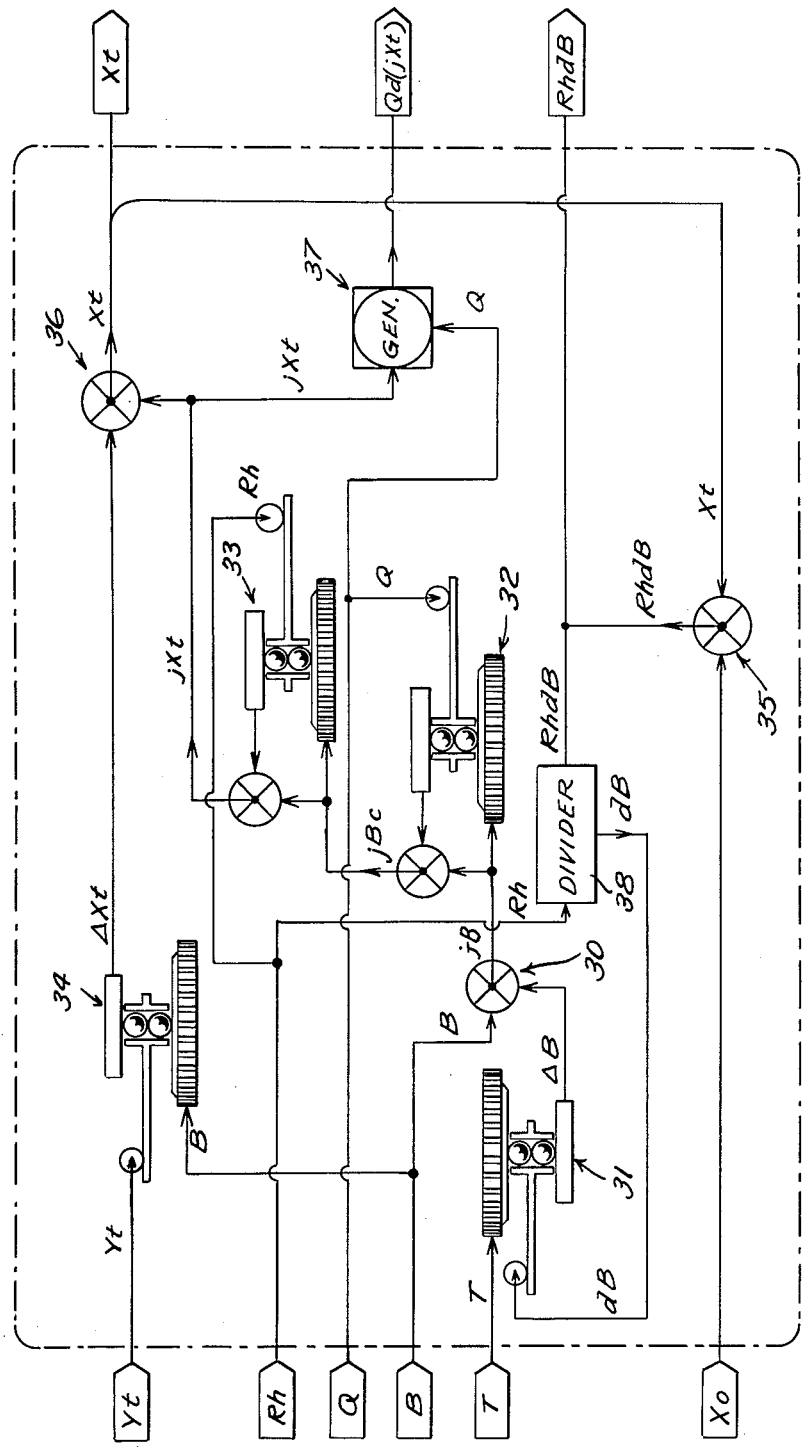
FIG. 11 is a diagram of the deflection rate computer of FIG. 10, but showing the components in greater detail.

The deflection rate computer of FIGS. 10 and 11, constituting part of the linear rates network of FIG. 8 embodies the principles of the basic rate computing loop shown in FIG. 2 and already described. In this computer, the true target bearing B obtained from the present position network (not shown) and the time T obtained from a time motor, are combined in a differential 30 and an integrator 31 to obtain *j*B, the change in bearing angle (i.e. angular correction). *j*B drives the disc of an integrator 32, while Q from the Q computer of FIG. 9 is made to change the gear ratio to the carriage of said integrator. This arrangement permits the introduction of various sensitivity constants Q to satisfy different smoothing and sensitivity constants. The roller output of the integrator 32, namely *j*Bc, the change in computed bearing rate (rate correction) is impressed upon the disc of an integrator 33, while R$h$ is impressed upon the carriage of said integrator 33 to obtain the quantity *j*Xt, which is the target deflection rate due to a change in target motion.

Figure 12:
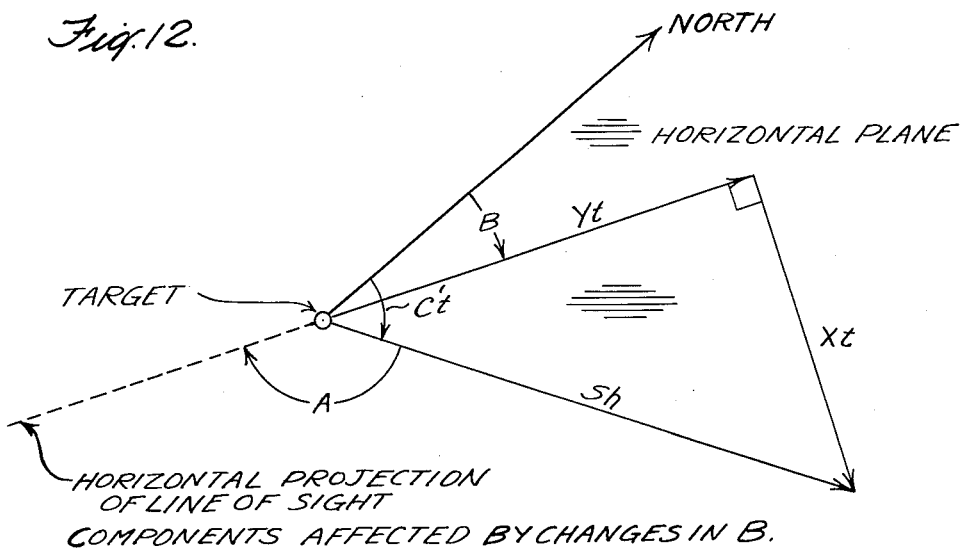
FIG. 12 is a diagram illustrating the effect of changes in B, the true target bearing, upon $Xt$, the lateral component of target velocity, measured perpendicular to the line of sight and upon $Yt$, the horinzontal line of sight component of target velocity.
Figure 13:
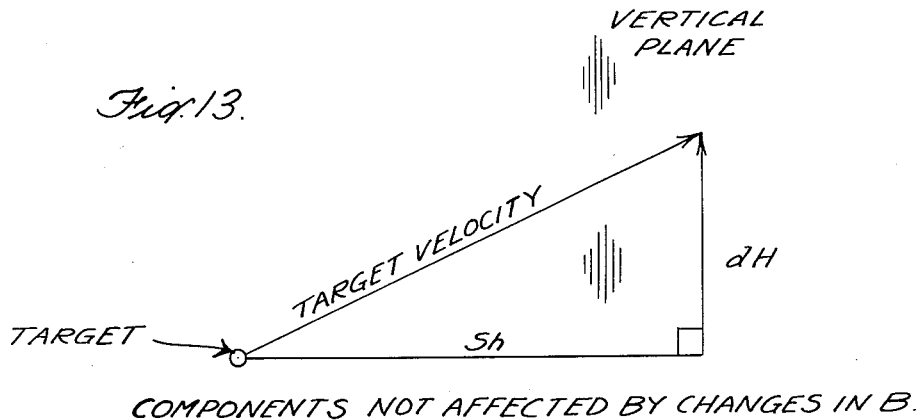
FIG. 13 is a diagram illustrating the effect of changes in B upon $dH$, the rate of climb or vertical component of target velocity.

An integrator 34 serves to generate ΔXt, the change in Xt due to changes in target bearing, Xt being the deflection component of target motion. For that purpose, B is fed into the disc of the integrator 34, while Yt, the horizontal line of sight component of target velocity is fed into the carriage of this integrator. The theory of operation of this integrator 34 is as follows: Since the horizontal components (FIG. 12) of target velocity are measured relative to the line of sight, they must vary with changes in B. That is not true of the vertical component *d*H, as shown by FIG. 13. Assuming that the target moves in a straight line at a constant speed, S$h$ and C$t$ remain constant.

Since $$A = B + 180° - Ct$$

Then $$dA = dB$$

From the right triangle in FIG. 11

$$Xt = Sh \sin A \quad (16)$$

and $$Yt = -Sh \cos A \quad (17)$$

Differentiating Equations 16 and 17

$$d(Xt) = Sh \cos A \, dA$$
$$d(Yt) = Sh \sin A \, dA$$

Substituting $-Yt$ for $Sh \cos A$, $Xt$ for $Sh \sin A$ and $dB$ for $dA$, we obtain $$d(Xt) = -Yt \, dB \tag{18}$$
$$d(Yt) = Xt \, dB \tag{19}$$

Integrating Equations 18 and 19

$$\Delta Xt = -\int Yt \, dB \tag{20}$$
$$\Delta Yt = \int Xt \, dB \tag{21}$$

The integrator 34 computes $\Delta Xt$ in accordance with Equation 20.

Since $\Delta Xt$ represents the change in $Xt$ due to changes in target bearing, any other changes in $(RhdB-Xo)$ obtained from a differential 35 must be due to a change in target motion from its assumed constant speed and linear course. The target deflection rate due to this change in target motion, and called $jXt$ generated by the integrator 33 is combined with $\Delta Xt$ in a differential 36 to form $Xt$ and also turns the rotor of a generator 37, whose voltage output represents $QdjXt$, the deflection component of target acceleration. This generator 37 is so designed, that its voltage output is proportional to the product of its field voltage Q, and the rate of change, $d(Xt)$, or its mechanical input $jXt$. This acceleration component $Qdt(jXt)$ is supplied to the acceleration smoothing network (FIG. 15).

The deflection component of target motion $Xt$ from the output of the differential 36 and the lateral component of ship motion $Xo$ obtained from the apparent wind network (not shown) are compared in the differential 35 to obtain the linear deflection rate $RhdB$ in accordance with the relation $RhdB = Xo + Xt$ (Equation 11), and to isolate $Xt$. This quantity $RhdB$ as well as $Rh$ obtained from the present position network (not shown) are introduced into a divider 38 to obtain $dB$ which serves to move the carriage of the integrator 31 and thereby to correct the position of said carriage, until it represents a smoothed value of $dB$.

The quantity $RhdB$ from the differential 35 and the quantity $Xt$ from the differential 36 are not only fed back into the system, as described, but are delivered in conjunction with the quantity $Qd(jXt)$ to the acceleration smoothing network (FIG. 15).

It should be noted that in the deflection rate computer of FIGS. 10 and 11, the quantity Q is applied to the quantity $jXt$ which is the rate correction to $\Delta Xt$ for changes in target speed or course, so that smoothing acts upon this correction. This quantity $jXt$ is a rate which does not change with time, if target speed and course remain constant and therefore is an invariant rate. The quantity $\Delta Xt$ is the generated lateral component of target velocity due to changes in target bearing and since the target bearing is continuously changing, even though the course of the target and its speed is constant, this quantity is a variant rate. Since the variant portion $\Delta Xt$ of $Xt$ is supplied by the integrator 34, the remainder of the loop is concerned only with the computation of $jXt$. Smoothing introduced by the rate computing loop, therefore, acts solely upon the invariant rate $jXt$ and the rate error caused by smoothing is consequently reduced.

HEIGHT AND HORIZONTAL RANGE RATE COMPUTER

In general, the function of the height and horizontal range rate computer shown in FIG. 14 is the same as that already described for the deflection rate computer of FIGS. 10 and 11. The main differences are in the number of units which must be inserted in the response line from the comparison differential to the integrator carriage to obtain the desired quantities. Since this height and horizontal range rate computer is similar to the deflection rate network of FIGS. 10 and 11, it will be only briefly described herein and only in connection with a block diagram.

In this height and horizontal range computer, the present target range R obtained from the gun director and the time T obtained from a time motor are combined in a differential 40 and an integrator 41 to obtain $jdR$. The quantity $jdR$ modified in an integrator by gear ratio correction Q from the Q computer of FIG. 9, is delivered to a component integrator 43 in conjunction with the position angle E derived from the present position network (not shown), to obtain the functions $jdR \cos E$ and $jdR \sin E$.

At the same time, the position angle E and the time T are combined in a differential 44 and an integrator 45 to obtain $jE$ which is modified by the present target range R in an integrator 46 to produce the quantity $jRdE$. This latter quantity after modification by the gear ratio Q in an integrator 47 is delivered to a component integrator 48 to obtain the functions $jRdE \cos E$ and $jRdE \sin E$. The quantity $jRdE \cos E$ from the component integrator 48 and the quantity $jdR \sin E$ from the component integrator 43 are delivered to a differential 49 to obtain the output $dH$ following the relationship $H = R \sin E$. This output $dH$ is multiplied by the sensitivity coefficient Q in a generator 50 to obtain the quantity $Qd(dH)$ for delivery to the acceleration smoothing network (FIG. 15) and is also made available to the prediction unit (FIG. 16).

The quantity $jRdE \sin E$ from the component integrator 48 and the quantity $jdR \cos E$ from the component integrator 43 are fed into a differential 51 to obtain the quantity $jYt$. This quantity $jYt$ and the quantity Q delivered to a generator 52 generates the quantity $Qd(jYt)$ which is one of the quantities desired for delivery to the accelerating smoothing network (FIG. 15).

The true target bearing B and the quantity $Xt$ obtained from the deflection rate computer of FIGS. 10 and 11 are delivered to an integrator 53 to obtain $\Delta Yt$ following Equation 21, namely $\Delta Yt = \int Xt \, dB$. This quantity $\Delta Yt$ compared with the quantity $jYt$ from the differential 51 produces in a differential 54 the quantity $Yt$ which is returned to the integrator 34 of the deflection rate computer of FIGS. 10 and 11 for the purpose already described. This quantity $Yt$ is also delivered to a differential 55 in conjunction with the quantity $Yo$ derived from the apparent wind network (not shown) to obtain the quantity $dRh$ which goes into a resolver 57 in conjunction with the position angle E, to obtain the functions $dRh \sin E$ and $dR \cos E$. A resolver 58 with inputs E and $dH$, generates functions $dH \cos E$ and $dH \sin E$. One of these quantities $dH \sin E$ and the quantity $dRh \cos E$ from the resolver 57 are compared in a differential 60 to produce $dR$ which is fed back into the integrator 41. The other quantity $dH \cos E$ from the resolver 58 is compared in a differential 61 with the quantity $dRh \sin E$ from the resolver 57 to generate the quantity $RdE$. This quantity $RdE$ delivered to a divider 62 in conjunction with the present target range R produces the quantity $dE$ which is fed back into the integrator 45.

The height and horizontal range computer of FIG. 14, as in the case of the deflection rate computer of FIGS. 10 and 11, embodies the principles of the basic rate computing looping of FIG. 2 described, and applies the quantity Q to quantity of $jYt$ which is the rate correction to $\Delta Yt$ for changes in target speed or course, so that smoothing acts upon this correction. This quantity $jYt$ is a rate which does not change with time, if target speed and course remain constant and therefore is an invariant rate. The quantity $\Delta Yt$ is a generated line of sight component of target velocity due to changes in target bearing, and since the target bearing is continuously changing even though the course of the target and its speed is constant, this quantity is a variant rate. Since the variant rate portion $\Delta Yt$ of $Yt$ is supplied by the integrator 53, the remainder of the loop is concerned only with the computation of $jYt$. Smoothing introduced by the rate computing loop, therefore, acts upon the invariant rate $jYt$ and the rate error caused by smoothing is consequently reduced.

In the deflection rate computer of FIGS. 10 and 11, the integrators 32 and 33 serve to obtain the quantity $jXt$ as described. In the height and horizontal range rate computer of FIG. 14, the arrangement for obtaining the quantity $jYt$ is somewhat as described, but the same principles are otherwise applied in the two computers.

ACCELERATION SMOOTHING NETWORK

As already pointed out, the acceleration smoothing network of FIG. 15 takes inputs $Qd(jXt)$; $Qd(jYt)$; $Qd(dH)$; $Q$; $1/Tf$ and $dB$ from the linear rates network (Figs. 8, 9, 10, 11 and 14), and from these in conjunction with K computes smoothed acceleration components of target motion relative to the line of sight. In addition to smoothing, this network also compensates for the delay time $Td$ equal to $Tc$ of the linear rates network.

As already described, with these inputs, the acceleration smoothing network (FIG. 15) solves the following equations for the smoothed deflection acceleration $d(xt)$, horizontal range acceleration $d(yt)$ and height acceleration $d(dh)$:

$$Qdxt = Qd(jXt) - d(dxt) - dB(dyt) \quad (1)$$
$$Qdyt = Qd(jYt) - d(dyt) + dB(dxt) \quad (2)$$
$$Qd(dh) = Qd(dH) - d^2(dh) \quad (3)$$

In connection with the basis rate computing loop of FIG. 2, it was shown that $$dBc = dB - \frac{1}{Q}(d^2Bc)$$

$$-\frac{1}{Q}d^2Bc$$

being the error in $dBc$. Similarly, it can be shown that Equations 1, 2 and 3 provide for similar compensation through the quantities $d(dxt)$, $d(dyt)$ and $d^2(dh)$ and in addition, by means of the quantities $dB(dyt)$, compensate for changes in the acceleration components $dxt$ and $dyt$, respectively, due to the changing position of the line of sight.

In the mechanization of Equations 1, 2 and 3 by the acceleration smoothing network of FIG. 15, the input quantity $Qd(jXt)$ and a feedback quantity $d(dxt)$ are compared in a differential 70 to obtain the output difference $Qd(jXt) - d(dxt)$, while the input quantity $dB$ and a feedback quantity $dyt$ are multiplied in a multiplier 71 to obtain the output product $dB(dyt)$ which is the quantity compensating for changes in the acceleration component $dyt$. These two outputs delivered to a differential 72 result in the quantity $Qdxt$ in accordance with Equation 1. The coefficient Q is removed from the quantity $Qdxt$ in a divider 73 to obtain the smoothed acceleration quantity $dxt$. This acceleration quantity $dxt$ is multiplied in a multiplier 74 by the acceleration constant K to obtain one of the inputs $Kdxt$ for the prediction unit (FIG. 16). This acceleration quantity $dxt$ is also delivered to a generator 75 to obtain the rate of change of this quantity $d(dxt)$, which contributes to the smoothing and which is fed back to the differential 70, as already described.

The bearing rate $dB$ and the acceleration quantity $dxt$ obtained as described above, are multiplied in a multiplier 76 to obtain the product $dB(dxt)$, which compensates for changes in the acceleration component $dxt$. The input quantity $Qd(jYt)$ from the height and horizontal range rate computer of FIG. 14 and a feedback quantity $d(dyt)$ are compared in a differential 77 to obtain the difference $Qd(jYt) - d(dyt)$. This latter quantity and the quantity $dB(dxt)$ obtained from the multiplier 76, when algebraically added in a differential 78, produce the quantity $Q(dyt)$, in accordance with Equation 2. This quantity $Q(dyt)$ is deprived of the factor Q by a divider 80. The resulting acceleration quantity $dyt$ is fed back into the multiplier 71, as previously described, and also into a generator 81, to obtain the rate of change of acceleration, namely, $d(dyt)$, which contributes to smoothing and which goes back as an input into the differential 77, as already described. This acceleration quantity $dyt$ is also delivered to a K multiplier 82 to obtain another input $K(dyt)$ for the prediction unit (FIG. 16).

To solve Equation 3, the input $Qd(dH)$ from the height and horizontal range rate computer of FIG. 14 and the feedback quantity $d^2(dh)$ are compared in a differential 83 to produce the quantity $Qd(dh)$. This latter quantity is deprived of its Q factor in a divider 84, to obtain the smoothed horizontal acceleration quantity $d(dh)$, which is multiplied by the acceleration constant K in a multiplier 85, to obtain the product $Kd(dh)$ serving as another input for the prediction unit (FIG. 16). This quantity $d(dh)$ fed into a generator 86 results in $d^2(dh)$, the rate of change of the acceleration term $d(dh)$. This quantity $d^2(dh)$ is fed back into the differential 83, as already described.

As already indicated, the value of K determines the percentage of target acceleration which enters into the prediction computations. A limit stop limits permissible values of K to values between zero and 1.4, that is, to values between 0% and 140% of that necessary for parabolic prediction. If K is zero, prediction is linear. The optimum value for K is $$K = 1 + 2Tc/Tf \quad (22)$$

in which the minimum value of $Tc$ is 2 seconds. For constant sigma operation where Q (equal to $1/Tc$) is varied to maintain a constant sigma (equal to $Tc/Tf$), the required value of K is constant and is obtained by the manual setting of an acceleration constant knob on the computer. For constant Q operation, a K computer shown in FIG. 15, automatically computes K from $1/Tf$ to satisfy the equation $$K = 1 + 2Tc/Tf$$

For that purpose, the quantity $1/Tf$ obtained from the Q computer of FIG. 9, and the quantity $Tc$ set by hand are multiplied in a multiplier 87 to obtain the quantity $2Tc/Tf$. A unit quantity is added to the latter quantity in a differential 88 to obtain the varying quantity K. This computed quantity K, as well as a constant quantity K, set manually from 0 to 1.4, go into a handcrank switch 90 for selection thereby to allow either of these K's to emerge for use. The selected K goes in as input into the three multipliers 74, 82 and 85, as already described.

PREDICTION UNIT

As already indicated, the smoothed acceleration quantities $Kdxt$, $Kdyt$ and $Kd(dh)$ derived from the acceleration smoothing network of FIG. 15, the quantity $Tf$ obtained from the ballistic network (not shown), and the quantities $dRh$, $RhdB$ and $dH$ derived from the linear rates network (FIGS. 8, 10, 11 and 14) are delivered to a prediction unit (FIG. 16), to compute the quantities $Rto$, $Dto$ and $Ht$ according to the following equations previously developed $$Rto = (dRh)(Tf) + \tfrac{1}{2}Kd(yt)(Tf)^2 \quad (9)$$
$$Dto = (RhdB)(Tf) + \tfrac{1}{2}Kd(xt)(Tf)^2 \quad (10)$$
$$Ht = dh(Tf) + \tfrac{1}{2}Kd(dh)(Tf)^2 \quad (6)$$

The prediction unit of FIG. 16 for mechanizing and solving these equations takes voltages proportional to $\tfrac{1}{2}Kd(yt)$, $\tfrac{1}{2}Kd(xt)$ and $\tfrac{1}{2}Kd(dh)$ obtained from the acceleration smoothing network of FIG. 15 and applies them across potentiometers 100, 101 and 102 respectively, whose rotors are positioned mechanically by the quantity $Tf$ derived from the ballistic network (not shown). These potentiometers 100, 101 and 102 are so constructed, that the portions of their windings corresponding to time of flights from 10 to 40 seconds are shorted. This makes the output of each potentiometer proportional to the product of T$f$ and the acceleration input when the former is less than ten seconds, and proportional to ten times the acceleration input, when T$f$ is greater than 10 seconds.

The output ½K$d$($yt$)(T$f$) of the potentiometer 100 is combined in a resistance summing network 103 with a voltage proportional to the quantity $dRh$ from the height and horizontal range rate computer of FIG. 14 to produce the voltage $dRh$+½K$d$($yt$)(T$f$). This latter voltage is applied across another potentiometer 104 whose rotor is positioned by T$f$. The output of this potentiometer 104 is the required range prediction of target motion R$to$, according to Equation 9.

Similiarly, the quantity R$hd$B from the deflection rate computer of FIGS. 10 and 11 and the quantities ½K$d$($xt$) and T$f$ are combined in a summing network 105 and potentiometer 106 to produce D$to$, the deflection correction to compensate for gun and target motion, according to Equation 10. In an identical loop consisting of the summing network 107 and the potentiometer 108, the quantity $d$H obtained from the height and horizontal range rate computer of FIG. 14 and the quantities ½K$d$($dh$)(T$f$) and T$f$ are combined to form the predicted change in height H$t$ during T$f$, according to Equation 6.

The outputs of the prediction unit of FIG. 16 are combined with other quantities in a network (not shown) to form the required ballistic range R2, ballistic position angle E2, vertical gun elevation E$g$ and horizontal deflection D$h$.

OPERATION OF THE PREDICTION SYSTEM

The flexibility of the prediction system of the present invention will be apparent from the following description:

Linear prediction—Constant Tc

Linear prediction may be achieved by maintaining the time constant T$c$ constant. A constant value of T$c$ is obtained by (1) adjusting the hand crank on potentiometer 23 of the Q computer of FIG. 9, (2) effecting the necessary selection in the switches 25 and 26 in said computer, (3) setting the acceleration constant K dial at the input to the switch 90 in the acceleration smoothing network of FIG. 15 to zero, and (4) making the necessary selection in said switch 90 to render said zero value of K available at the output of said switch.

Linear prediction gives a true prediction for a target with constant linear velocity, provided the target has been tracked accurately for a sufficient time, say 3 or 4 time constants. When the target is not flying a linear course, the predicted target positions when using linear prediction are shown in FIG. 17. In this FIG 17, the solid curve on the left represents the path of a target, flying, for example, at 500 knots with a transverse acceleration of two gees. The locus of the predicted target positions for various time constant settings is shown on the right, in FIG. 17. The line tangent to the target path at its present position labeled "Ideal Linear Prediction," is the prediction usually associated with linear predictors. However, it is never attained in actual practice, because a time constant T$c$ of zero would magnify any "noise" (errors due to tracking perturbations), to the point of instability.

The locus of the predicted target positions for time constants T$c$ of 5 and 10 seconds is also shown in FIG. 17. In each case the prediction is made on the basis of the target vector that existed a time in the past equal to the delay time T$d$. For instance, since simple exponential smoothing is used on the target rates, the delay time T$d$, or the time in the past when the actual target vector was the same as the present computer solution, is equal to the time constant T$c$. Therefore, when the time constant is 5 seconds, the locus of prediction target positions is parallel to the target speed vector that existed 5 seconds in the past. The geometrical error (that due to target maneuver) associated with linear prediction with a constant time constant T$c$ is apparent from FIG. 17.

Linear prediction—Constant sigma

In case it is desired to operate the prediction system with constant sigma Σ, i.e. T$c$/T$f$, this can be done by (1) setting the potentiometer 21 of the Q computer of FIG. 9, to the described constant sigma value, (2) making the necessary selections in the switches 25 and 26, (3) setting the acceleration constant K dial at the input of the switch 90 in the acceleration smoothing network of FIG. 15 to zero, and (4) making the necessary selection in said switch 90 to render this zero value of K available at the output of said switch 90.

The locus of the predicted target positions, when using a constant sigma, for the same target as shown in FIG. 17, is shown in FIG. 18. It can be seen that as the time of flight T$f$ increases, rather large geometrical errors are encountered. Although not indicated in FIG. 18, constant sigma operation usually results in excessive noise errors at short range.

Curvilinear prediction—Constant Tc and constant K

Curvilinear prediction is prediction which is based not only on the target's past rates but the target's past acceleration. FIG. 19 indicates the relative weight given past acceleration data.

Curvilinear prediction is exact for a target flying a linear course or a course with a constant acceleration. Curvilinear prediction may be obtained by setting the acceleration constant K selector in the input to the switch 90 of the acceleration smoothing network (FIG. 15) to a value different from zero. The nature of the geometric errors encountered when the acceleration constant K is set at 1 for a target with a constantly changing acceleration is indicated in FIG. 19. It can be seen that the curvilinear prediction is the result of superimposing acceleration corrections on the linear prediction. The direction of the acceleration corrections, that is, the acceleration vector in the computer, corresponds to the actual target acceleration 2T$c$ seconds ago. The break in the curve at a time of flight of 10 seconds is caused by the fact that curvilinear prediction is limited to times of flight T$f$ below ten seconds. A family of predicted target positions lying between curve A and curve B (FIG. 19) may be obtained by varying K from 1 to zero.

FIG. 19 indicates a prediction which for the specific example shown may be undesirable, due mainly to the lag in the direction of the computer speed vector. A way of minimizing this undesirable feature is described hereinafter.

Curvilinear prediction—Constant Tc—constant K equal to 1+2Σ

It can be shown that if the acceleration constant K is set equal to 1+2Σ, it has the effect of eliminating the lag in the smoothed velocity vector. To make the acceleration constant K equal to 1+2Σ, the handswitch 90 in the acceleration smoothing network of FIG. 15 is set to permit this automatically determined quantity to pass therethrough and to become available.

FIG. 20 shows the locus of the predicted target positions when the acceleration constant K equals 1+2Σ. This type of prediction appears reasonable in that the predicted path is almost a continuation of the past data. Here again, the curvilinear prediction is limited to times of flight T$f$ below ten seconds.

Curvilinear prediction—Constant sigma—acceleration constant K equal to 1+2Σ

This type of prediction may be obtained by setting the potentiometer 21 in the Q computer of FIG. 9 for constant sigma and making the necessary selections in the switches 25 and 26 in said computer. Also, the handswitch 90 in the acceleration smoothing network of FIG. 15 is set to permit the automatically determined quantity K corresponding to 1+2Σ to be made available. The geometrical errors for this type of prediction for a target with a changing acceleration is indicated in FIG. 21.

In the following claims, the terms used therein correspond to those in the glossary of the specification herein, unless otherwise indicated and represent physical quantities, such as mechanical movement or electric current.

What is claimed is:

1. In a curved target course predictor for a gun fire control system, a deflection rate computer comprising a first means operable in response to a constant time input signal, to an input feedback signal proportional to $dB$, to an input signal proportional to $Rh$ and to an input signal proportional to Q for producing a signal proportional to $jXt$, a second means for combining the $jXt$ signal derived from the output of said first means and the Q signal to produce a signal proportional to $Qd(jXt)$, a third means responsive to input signals proportional to $Yt$ and B and to the input signal $jXt$ derived as the output of said first means for producing a signal proportional to $Xt$, a fourth means responsive to the input action of the signal $Xt$ derived as an output of said third means and of a signal proportional to $Xo$ for producing a signal proportional to $RhdB$, a divider for dividing the $RhdB$ signal derived as the output of said fourth means by a signal proportional to $Rh$ to produce the signal $dB$, and means for feeding the signal $dB$ derived as the output of said divider back as an input into said first means.

2. In a curved target course predictor for a gun fire control system, a deflection rate computer comprising a first integrator operable in response to a constant time input signal and an input feedback signal proportional to $dB$ for producing a signal proportional to $\Delta B$ corresponding to the integral of the signal $dB$, a first differential having as input the signal $\Delta B$ derived from the output of said first integrator and having also as input a signal proportional to B, integrator means responsive to the input action of the output of said first differential, of a signal proportional to $Rh$ and of a signal proportional to a selected sensitivity coefficient Q for producing a signal proportional to $jXt$, a second integrator for obtaining a signal proportional to $\Delta Xt$ in response to an input signal proportional to $Yt$ and the signal B as input, a second differential for producing a signal proportional to $Xt$ from input signals $\Delta Xt$ and $jXt$ derived from the output of said integrator and said integrator means respectively, a third differential having as one input the signal $Xt$ derived from the output of said second differential and having as the other input a signal proportional to $Xo$ to produce a signal proportional to $RhdB$, a divider having as one input the signal $Rh$ and as another input the signal $RhdB$ derived from the output of said third differential to obtain the signal $dB$, means for feeding the signal $dB$ back as input into said first integrator, and means for combining the signal $jXt$ derived from the output of said integrator means and the signal Q to produce a signal proportional to $Qd(jXt)$.

3. In a curved target course predictor for a gun fire control system, a height and horizontal range computer comprising a first means operable in response to a constant time input signal, an input feedback signal proportional to $dE$, an input signal proportional to E, an input signal proportional to R and an input signal proportional to Q, for producing a signal proportional to $jRdE$, a second means operable in response to a constant time input signal, a feedback signal proportional to $dR$ as input, the R signal as input and the Q signal as input for producing a signal proportional to $jdR$, means responsive to the signals $jRdE$, $jdR$ and E as inputs for producing signals proportional to $dH$ and $jYt$, means responsive to the signals $dH$ and Q as inputs for producing a signal proportional to $Qd(dH)$, means responsive to the signals $jYt$ and Q as inputs for producing a signal proportional to $Qd(jYt)$, means responsive to signals proportional to B and $Xt$ as inputs for producing a signal proportional to $\Delta Yt$, means responsive to the input signals $\Delta Yt$ and $jYt$ for producing a signal proportional to $Yt$, means for comparing a signal proportional to $Yo$ and the signal $Yt$ to produce a signal proportional to $dRh$, means responsive to signals $dH$, E and $dRh$ as inputs for producing a signal proportional to $RdE$ and the signal $dR$, means for dividing the signal $RdE$ by the signal R to produce the signal $dE$, means for feeding the signal $dE$ back to said first means as an input, and means for feeding the signal $dR$ back to said second means as an input.

4. In a curved target course predictor for a gun fire control system, a height and horizontal range computer comprising a first integrator operable in response to a constant time input signal, and a feedback input signal proportional to $dE$ for producing a signal proportional to $\Delta E$ corresponding to the integral of $dE$, a first differential having as input signal $\Delta E$ derived from the output of said first integrator and as input a signal proportional to E, a first integrator means responsive to the input action of the output of said first differential, of a signal proportional to R and of a signal proportional to a selected sensitivity coefficient Q for producing a signal proportional to $jRdE$, a first resolver having as one input the signal $jRdE$ derived from the output of said integrator means and having as another input the signal E for producing signals proportional to $jRdE \cos E$ and $jRdE \sin E$, a second integrator operable in response to a constant time input signal and a feedback input signal proportional to $dR$ for producing a signal proportional to $\Delta R$ corresponding to the integral of $dR$, a second differential having as one input the signal $\Delta R$ derived from the output of said second integrator and having as another input the signal R, a second integrator means responsive to the input action of the output of said second differential and of the signal Q for producing a signal proportional to $jdR$, a second resolver having as one input the signal $jdR$ derived from the output of said second integrator means and having as another input the signal E for producing signals proportional to $jdR \cos E$ and $jdR \sin E$, a third differential for comparing the signal $jRdE \cos E$ derived from the output of the first resolver and the signal $jdR \sin E$ derived from the output of the second resolver to produce a signal proportional to $dH$, means for combining the signal Q and the signal $dH$ obtained as the output of said second differential to produce a signal proportional to $Qd(dH)$, a third resolver with the signal $dH$ as input derived from said third differential and signal E as input for producing signals proportional to $dH \cos E$ and $dH \sin E$, a fourth differential for comparing the signal $jdR \cos E$ derived from the output of the second resolver and the signal $jRd \sin E$ derived from the output of the first resolver for producing a signal proportional to $jYt$, means for combining the signals Q and $jYt$ derived from the output of said fourth differential for producing a signal proportional to $Qd(jYt)$, a third integrator operable in response to signals proportional to B and $Xt$ for producing a signal proportional to $\Delta Yt$, a fifth differential for comparing the output signal $jYt$ from said fourth differential and the output signal $\Delta Yt$ from said third integrator to produce a signal proportional to $Yt$, a sixth differential for comparing the output signal $Yt$ from said fifth differential and a signal proportional to $Yo$ to produce a signal proportional to $dRh$, a fourth resolver with signal $dRh$ as input derived from the output of said sixth differential and signal E as another input to produce signals proportional to $dRh \cos E$ and $dRh \sin E$, a seventh differential for comparing the output signal $dH \cos E$ from said third resolver and the output signal $dRh \sin E$ from said fourth resolver for producing a signal proportional to R$d$E, a divider for dividing the signal R$d$E from said seventh differential by the signal R to produce the signal $d$E, means for feeding the signal $d$E back to said first integrator, an eighth differential for comparing the output signal $d$H sin $E$ from said third resolver and the output signal $d$R$h$ cos $E$ from said fourth resolver to produce the signal $d$R, and means for feeding the signal $d$R back to said second integrator.

5. In a curved target course predictor for a gun fire control system, a Q computer comprising a first means responsive to a signal proportional to $1/Tf$ as input and to a low-value constant input sigma adjustment signal for producing a signal proportional to Q for initial operating conditions and for anti-aircraft gun fire control, a second means responsive to the signal $1/Tf$ as input and to a high-value constant input sigma adjustment for producing a signal proportional to Q for steady operating conditions and for anti-aircraft gun fire control, a time delay mechanism having the Q output signals of said first and second means as inputs and automatically operable to prevent the transmission of the Q output signal of said second means therethrough during a predetermined initial operating period, while allowing the transmission of the Q output signal of said first means, and to cut off the transmission of the Q output signal of said first means after a predetermined initial operating period and at the same time to release the Q output signal of said second means for transmission therethrough for steady state operation, a third means responsive to a $Tc$ input signal adjustment for producing as output a signal proportional to Q for constant $Tc$ useful for anti-aircraft gun fire control, a fourth means responsive to the signal $1/Tf$ as input and to a constant sigma input adjustment signal for producing as output a signal proportional to Q for constant sigma, useful for surface gun fire control, a first switch device for rendering selectively either the Q output signal of said time delay mechanism or the Q output signal of said third means available for computing use and a second switch device for rendering selectively either the Q output signal of said first switch device or the Q output signal of said fourth means available for computing use.

6. In a curved target course predictor for a gun fire control system, an acceleration smoothing network for determining the quantities corresponding to K$d(xt)$ and K$d(yt)$, the combination comprising a first differential for comparing a signal proportional to Q$d(jXt)$ and a feedback signal proportional to Q$d(JXt)-d(dxt)$, a first multiplier having as inputs a signal proportional to $d$B and a feedback signal proportional to $d(yt)$ for producing a signal proportional to $d$B$(dyt)$, a second differential for comparing the signal $$Qd(JXt)-d(dxt)$$

with the signal $d$B$(dyt)$ to produce a signal proportional to Q$dxt$ in accordance with the equation $$Qdxt=Qd(JXt)-d(dxt)-dB(dyt)$$

a divider for dividing the signal Q$dxt$ by a signal proportional to Q to produce a signal proportional to $d(xt)$, means for determining the derivative of the signal $d(xt)$ to produce a signal proportional to $d(dxt)$, means for feeding the signal $d(dxt)$ back as an input into said first differential, means for multiplying the signal $d(xt)$ by a signal corresponding to K to produce a signal proportional to K$d(xt)$, a second multiplier with input signal $d$B and feedback input signal $d(xt)$ to produce a signal proportional to $d$B$(dxt)$, a third differential for comparing a signal proportional to Q$d(jYt)$ and a feedback signal proportional to $d(dyt)$ to produce a signal proportional to Q$d(jYt)-d(dyt)$, a fourth differential for adding the signals Q$d(jYt)-d(dyt)$ and $d$B$(dxt)$ to produce a signal proportional to Q$dyt$ in accordance with the equation, $$Qdyt=Qd(jYt)-d(dyt)+dB(dxt)$$

means for dividing the signals Q$dyt$ by Q to produce the signal $d(yt)$, means for feeding the signal $d(yt)$ as input back into said first multiplier, means for determining the derivative of the signal $d(yt)$ to produce the signal $d(dyt)$, means for feeding the signal $d(dyt)$ as input back into said third differential, and means for multiplying the signal $d(yt)$ by the signal K to produce a signal proportional to K$d(yt)$.

7. In a curved target course predictor for a gun fire control system, an acceleration smoothing network for determining the quantity K$d(dh)$, the combination comprising a differential for comparing an input signal proportional to Q$d(dH)$ and a feedback input signal proportional to $d^2(dh)$ to produce a signal proportional to Q$d(dh)$ in accordance with the equation $$Qd(dh)=Qd(dH)-d^2(dh)$$

means for dividing the signal Q$d(dh)$ by a signal proportional to Q to produce a signal proportional to $d(dh)$, means for determining the derivative of the signal $d(dh)$ to produce the signal $d^2(dh)$, means for feeding the signal $d^2(dh)$ back to said differential as input, and means for multiplying the signal $d(dh)$ by a signal corresponding to K to produce a signal proportional to the signal K$d(dh)$.

8. In a curved target course predictor for a gun fire control system, an acceleration smoothing network comprising a device for determining a signal corresponding to K, a multiplier for multiplying a signal proportional to $1/Tf$ by a signal proportional to $2Tc$ to produce a signal proportional to $2Tc/Tf$, a differential for adding the signal $2Tc/Tf$ to unity to produce a signal proportional to $1+2Tc/Tf$, and a switch having as input the signal $1+2Tc/Tf$ corresponding to an automatically determined K and as a manual input a signal corresponding to a selected constant K, said switch being operable to permit the transmission therethrough selectively of either one of said K signals, to render either of said K signals available for computing purposes.

9. In a curved target course predictor for a gun fire control system, a prediction unit for solving the equation $$Rto=(dRh)(Tf)+\tfrac{1}{2}Kd(yt)(Tf)^2$$

which comprises a multiplier for multiplying a signal proportional to K$d(yt)$ by a signal proportional to $Tf$ to produce a signal proportional to K$d(yt)(Tf)$, a differential for adding the signal K$d(yt)(Tf)$ and a signal proportional to $d$R$h$ to produce a signal proportional to $dRh+Kd(yt)(Tf)$, and a multiplier for multiplying a signal proportional to $dRh+\tfrac{1}{2}Kd(yt)(Tf)$ by the signal $Tf$ to produce a signal proportional to R$to$.

10. In a curved target course predictor for a gun fire control system, a prediction unit for solving the equation $$Dto=(RhdB)(Tf)+\tfrac{1}{2}Kd(xt)(Tf)^2$$

which comprises a multiplier for multiplying a signal proportional to K$d(xt)$ by a signal proportional to $Tf$ to produce a signal proportional to K$d(xt)(Tf)$, a differential for adding the signal K$d(yt)(Tf)$ and a signal proportional to R$hdB$ to produce a signal proportional to $RhdB+Kd(xt)(Tf)$, and a multiplier for multiplying a signal proportional to $RhdB+\tfrac{1}{2}Kd(xt)(Tf)$ by the signal $Tf$ to produce a signal proportional to D$to$.

11. In a curved target course predictor for a gun fire control system, a prediction unit for solving the equation $$Ht=dHt(Tf)+\tfrac{1}{2}Kd(dh)(Tf)^2$$

which comprises a multiplier for multiplying a signal proportional to K$d(dh)$ by a signal proportional to $Tf$ to produce a signal proportional to K$d(dh)(Tf)$, a differential for adding the signal K$d(dh)(Tf)$ and a signal proportional to $d$H to produce a signal proportional to $dH+Kd(dh)(Tf)$, and a multiplier for multiplying a signal proportional to $dH+\tfrac{1}{2}Kd(dh)(Tf)$ by the signal $Tf$ to produce a signal proportional to H$t$.

12. A curved course predictor for a gun fire control system having a Q computer comprising a first means responsive to a signal proportional to 1/$Tf$ as input and to a low-value constant input sigma adjustment signal for producing a signal proportional to Q for initial operating conditions and for anti-aircraft gun fire control, a second means responsive to the signal 1/$Tf$ as input and to a high-value constant input sigma adjustment for producing a signal proportional to Q for steady operating conditions and for anti-aircraft gun fire control, a time delay mechanism having the Q output signals of said first and second means as inputs and automatically operable to prevent the transmission of the Q output signal of said second means therethrough during a predetermined initial operating period, while allowing the transmission of the Q output signal of said first means, and to cut-off the transmission of the Q output signal of said first means after a predetermined initial operating period and at the same time to release the Q output signal of said second means for transmission therethrough for steady state operation, a third means responsive to a Tc input signal adjustment for producing as output a signal proportional to Q for constant Tc useful for anti-aircraft gun fire control, a fourth means responsive to the signal 1/$Tf$ as input and to a constant sigma input adjustment signal for producing as output a signal proportional to Q for constant sigma, useful for surface gun fire control, a first switch device for rendering selectively either the Q output signal of said third means available for computing use and a second switch device for rendering selectively either the Q output signal of said first switch device or the Q output signal of said fourth means available for computing use, said curved course predictor including in addition, (1) a deflection rate computer comprising a fifth means operable in response to a constant time input signal, a feedback input signal proportional to $dB$, an input signal proportional to $Rh$ and the Q input signal for producing a signal proportional to $jXt$, a sixth means for combining the signal $jXt$ and Q to produce a signal proportional to $Qd(jXt)$, a seventh means responsive to input signals proportional to $Yt$ and B and to the input signal $jXt$ for producing a signal proportional to $Xt$, an eighth means responsive to the input action of signal $Xt$ and of a signal proportional to $Xo$ for producing a signal proportional to $RhdB$, a divider for dividing the signal $RhdB$ by a signal proportional to $Rh$ to produce the signal $dB$, and means for feeding the signal $dB$ back as an input into said fifth means, (2) a height and horizontal range computer comprising a ninth means operable in response to a constant time input signal, a feedback input signal proportional to $dE$, an input signal proportional to E, an input signal proportional to R and the Q signal as input for producing a signal proportional to $jRdE$, a tenth means operable in response to a constant time input signal, a feedback input signal proportional to $dR$, the signal R as input and the signal Q as input for producing a signal proportional to $jdR$, means responsive to the signals $jRdE$, $jdR$ and E as inputs for producing signals proportional to $dH$ and $jYt$, means responsive to the signals $dH$ and Q as inputs for producing a signal proportional to $Qd(dH)$, means responsive to the signal $jYt$ as input and to the signal Q as input for producing a signal proportional to $Qd(jYt)$, means responsive to the signals B and $Xt$ as inputs for producing a signal proportional to $\Delta Yt$, means responsive to the signals $\Delta Yt$ and $jYt$ as inputs for producing the signal $Yt$, means for comparing a signal proportional to $Yo$ and the signal $Yt$ to produce a signal proportional to $dRh$, means responsive to the signals $dH$, E and $dRh$ as inputs for producing a signal proportional to $RdE$ and the signal $dR$, means for dividing the signal $RdE$ by the signal R to produce the signal $dE$, means for feeding the signal $dE$ back to said ninth means as an input, and means for feeding the signal $dR$ back to said tenth means as an input, (3) an acceleration smoothing network for determining the quantities $Kd(xt)$, $Kd(yt)$ and $Kd(dh)$ comprising a first differential for comparing a signal proportional to $Qd(jXt)$ and a feedback signal proportional to $d(dxt)$ to produce as output a signal proportional to $Qd(jXt)-d(dxt)$, a first multiplier with the signal $dB$ as input and a feedback signal proportional to $d(yt)$ as input for producing a signal proportional to $dB(dyt)$, a second differential for comparing the signal $Qd(jXt)-d(dxt)$ with the signal $dB(dyt)$ to produce a signal proportional to $Qdxt$ in accordance with the equation $$Qdxt = Qd(jXt) - d(dxt) - dB(dyt)$$

a divider for dividing the signal $Qdxt$ by the signal Q to produce a signal proportional to $d(xt)$, means for determining the derivative of the signal $d(xt)$ to produce the signal $d(dxt)$, means for feeding the signal $d(dxt)$ back as an input into said first differential, means for multiplying the signal $d(xt)$ by a signal corresponding to K to produce a signal proportional to $Kd(xt)$, a second multiplier with signals $dB$ and $d(xt)$ as inputs to produce a signal proportional to $dB(dxt)$, a third differential for comparing the signal $Qd(jYt)$ and a feedback signal proportional to $d(dyt)$ to produce a signal proportional to $Qd(jYt)-d(dyt)$, a fourth differential for adding the signals $Qd(jYt)-d(dyt)$ and $dB(dxt)$ to produce a signal proportional to $Qdyt$ in accordance with the equation $$Qdyt = Qd(jYt) - d(dyt) + db(dxt)$$

means for dividing the signal $Qdyt$ by the signal Q to produce the signal $d(yt)$, means for feeding the signal $d(yt)$ as input back into said first multiplier, means for determining the derivative of the signal $d(yt)$ to produce the signal $d(dyt)$, means for feeding the signal $d(dyt)$ as input back into said third differential, means for multiplying the signal $d(yt)$ by the signal K to produce a signal proportional to $Kd(yt)$, a fifth differential for comparing the signal $Qd(dH)$ and a feedback signal proportional to $d^2(dh)$ to produce the signal $Qd(dh)$ in accordance with the equation $$Qd(dh) = Qd(dH) - d^2(dh)$$

means for dividing the signal $Qd(dh)$ by the signal Q to produce a signal proportional to $d(dh)$, means for determining a signal proportional to the derivative of the signal $d(dh)$ to produce the signal $d^2(dh)$, means for feeding the signal $d^2(dh)$ back to said fifth differential as input and means for multiplying the signal $d(dh)$ by the signal K to produce a signal proportional to $Kd(dh)$, (4) a K computer comprising a multiplier for multiplying the 1/$Tf$ signal by the 2Tc signal to produce a signal proportional to $2Tc/Tf$, a differential for adding the signal $2Tc/Tf$ to unity to produce the signal $1+2Tc/Tf$, and a switch having as input the signal $1+2Tc/Tf$ corresponding to an automatically determined K signal and a manual input signal corresponding to a selected constant K, said latter switch being operable to permit the transmission therethrough selectively of either one of said K signals, to render either of said K signals available for computing purposes and (5) a prediction unit for solving the equations $$Rto = (dRh)(Tf) + \tfrac{1}{2}Kd(yt)(Tf)^2$$
$$Dto = (RhdB)(Tf) + \tfrac{1}{2}Kd(xt)(Tf)^2$$
$$Ht = dH(Tf) + \tfrac{1}{2}Kd(dh)(Tf)^2$$

which comprises a multiplier for multiplying the signal $Kd(yt)$ by the signal $Tf$ to produce a signal proportional to $Kd(yt)(Tf)$, a differential for adding the signal $Kd(yt)(Tf)$ and the signal $dRh$ to produce the signal proportional to $dRh + Kd(yt)(Tf)$, a multiplier for multiplying the signal $dRh + \tfrac{1}{2}Kd(yt)(Tf)$ by the signal $Tf$ to produce a signal proportional to $Rto$, a multiplier for multiplying the signal $Kd(xt)$ by the signal $Tf$ to produce a signal proportional to $Kd(xt)(Tf)$, a differential for adding the signals $Kd(yt)(Tf)$ and $RhdB$ to produce a signal proportional to $RhdB+Kd(xt)(Tf)$, a multiplier for multiplying the signal $RhdB+\frac{1}{2}Kd(xt)(Tf)$ by the signal $Tf$ to produce a signal proportional to $Dto$, a multiplier for multiplying the signal $Kd(dh)$ by the signal $Tf$ to produce a signal proportional to $Kd(dh)(Tf)$, a differential for adding the signal $Kd(dh)(Tf)$ and the signal $dH$ to produce a signal proportional to $$dH+Kd(dh)(Tf)$$

and a multiplier for multiplying the signal $$dH+\frac{1}{2}Kd(dh)(Tf)$$

by the signal $Tf$ to produce a signal proportional to $Ht$.

13. A curved target course predictor for a gun fire control system comprising a Q computer, a deflection rate computer for producing the signals $Xt$, $Qd(jXt)$ and $RhdB$, said deflection rate computer comprising a first means operable in response to a constant time input signal, to an input feedback signal proportional to $dB$, to an input signal proportional to $Rh$ and to an input signal proportional to Q for producing a signal proportional to $jXt$, a second means for combining the $jXt$ signal derived from the output of said first means and the Q signal to produce a signal proportional to $Qd(jXt)$, a third means responsive to input signals proportional to $Yt$ and B and to the input signal $jXt$ derived as the output of said first means for producing a signal proportional to $Xt$, a fourth means responsive to the input action of the signal $Xt$ derived as an output of said third means and of a signal proportional to $Xo$ for producing a signal proportional to $RhdB$, a divider for dividing the $RhdB$ signal derived as the output of said fourth means by a signal proportional to $Rh$ to produce the signal $dB$, and means for feeding the signal $dB$ derived as the output of said divider back as an input into said first means, a height and horizontal range computer operable in response to the signals Q, B and $Xt$ and to signals proportional to R, E, $Yo$ and T for producing signals proportional to $dH$, $Qd(dH)$, $dRh$, $Qd(jYt)$ and $Yt$, an acceleration smoothing network for producing signals proportional to $Kd(xt)$, $Kd(yt)$ and $Kd(dh)$ and a prediction unit operable in response to the signals $Tf$, $dRh$, $Kd(yt)$, $RhdB$, $Kd(xt)$, $dH$ and $Kd(dh)$ for producing signals proportional to $Rto$, $Dto$ and $Ht$.

14. A curved target course predictor for a gun fire control system comprising a Q computer, a deflection rate computer for producing signals proportional to $Xt$, $Qd(jXt)$ and $RhdB$, a height and horizontal range computer operable in response to the signals Q, R, E, B and $Xt$ and to signals proportional to $Yo$ and T for producing the signals $dH$, $Qd(dH)$, $dRh$, $Qd(jYt)$ and $Yt$, and comprising a first means operable in response to a constant time input signal, an input feedback signal proportional to $dE$, an input signal proportional to E, an input signal proportional to R and an input signal proportional to Q, for producing a signal proportional to $jRdE$, a second means operable in response to a constant time input signal, a feedback signal proportional to $dR$ as input, the R signal as input and the Q signal as input for producing a signal proportional to $jdR$, means responsive to the signals $jRdE$, $jdR$ and E as inputs for producing signals proportional to $dH$ and $jYt$, means responsive to the signals $dH$ and Q as inputs for producing a signal proportional to $Qd(dH)$, means responsive to the signals $jYt$ and Q as inputs for producing a signal proportional to $Qd(jYt)$, means responsive to signals proportional to B and $Xt$ as inputs for producing a signal proportional to $\Delta Yt$, means responsive to the input signals $\Delta Yt$ and $jYt$ for producing a signal proportional to $Yt$, means for comparing a signal proportional to $Yo$ and the signal $Yt$ to produce a signal proportional to $dRh$, means responsive to signals $dH$, E and $dRh$ as inputs for producing a signal proportional to $RdE$ and the signal $dR$, means for dividing the signal $RdE$ by the signal R to produce the signal $dE$, means for feeding the signal $dE$ back to said first means as an input, and means for feeding the signal $dR$ back to said second means as an input, an acceleration smoothing network for producing signals proportional to $Kd(xt)$, $Kd(yt)$ and $Kd(dh)$, and a prediction unit operable in response to the signals $dRh$, $Kd(yt)$, $RhdB$, $Kd(xt)$, $dH$ and $Kd(dh)$ for producing signals proportional to $Rto$, $Dto$ and $Ht$.

15. A curved target course predictor for a gun fire control system comprising a Q computer, a deflection rate computer for producing signals proportional to $Xt$, $Qd(jXt)$ and $RhdB$, a height and horizontal range computer operable in response to signals proportional to Q, R, E, $Yo$, T, B and $Xt$ for producing signals proportional to $dH$, $Qd(dH)$, $dRh$, $Qd(jYt)$ and $Yt$, an acceleration smoothing network for producing the signals $Kd(xt)$ and $Kd(yt)$ comprising a first differential for comparing a signal proportional to $Qd(jXt)$ and a feedback signal proportional to $d(dxt)$ to produce as output a signal proportional to $Qd(jXt)-d(dxt)$, a first multiplier having as inputs a signal proportional to $dB$ and a feedback signal proportional to $d(yt)$ for producing a signal proportional to $dB(dyt)$, a second differential for comparing the signal $Od(jXt)-d(dxt)$ with the signal $dB(dyt)$ to produce a signal proportional to $Qdxt$ in accordance with the equation $$Qdxt=Qd(jXt)-d(dxt)-dB(dyt)$$

a divider for dividing the signal $Qdxt$ by a signal proportional to Q to produce a signal proportional to $d(xt)$, means for determining the derivative of the signal $d(xt)$ to produce a signal proportional to $d(dxt)$, means for feeding the signal $d(dxt)$ back as an input into said first differential, means for multiplying the signal $d(xt)$ by a signal corresponding to K to produce a signal proportional to $Kd(xt)$, a second multiplier with input signal $dB$ and feedback input signal $d(xt)$ to produce a signal proportional to $dB(dxt)$, a third differential for comparing a signal proportional to $Qd(jYt)$ and a feedback signal proportional to $d(dyt)$ to produce a signal proportional to $Qd(jYt)-d(dyt)$, a fourth differential for adding the signals $Qd(jYt)-d(dyt)$ and $dB(dxt)$ to produce a signal proportional to $Qdyt$ in accordance with the equation, $$Qdyt=Qd(jYt)-d(dyt)+dB(dxt)$$

means for dividing the signals $Qdyt$ by Q to produce the signal $d(yt)$, means for feeding the signal $d(yt)$ as input back into said first multiplier, means for determining the derivative of the signal $d(yt)$, to produce the signal $d(dyt)$, means for feeding the signal $d(dyt)$ as input back into said third differential, and means for multiplying the signal $d(yt)$ by the signal K to produce a signal proportional to $Kd(yt)$, an acceleration smoothing network for producing a signal proportional to $Kd(dh)$ comprising a differential for comparing an input signal proportional to $Qd(dH)$ and a feedback input signal proportional to $d^2(dh)$ to produce a signal proportional to $Qd(dh)$ in accordance with the equation $$Qd(dh)=Qd(dH)-d^2(dh)$$

means for dividing the signal $Qd(dh)$ by a signal proportional to Q to produce a signal proportional to $d(dh)$, means for determining the derivative of the signal $d(dh)$ to produce the signal $d^2(dh)$, means for feeding the signal $d^2(dh)$ back to said differential as input, and means for multiplying the signal $d(dh)$ by a signal corresponding to K to produce a signal proportional to the signal $Kd(dh)$, and a prediction unit operable in response to a signal proportional to $Tf$, and in response to the signals $dRh$, $Kd(yt)$, $RhdB$, $Kd(xt)$, $dH$ and $Kd(dh)$ for producing signals proportional to $Rto$, $Dto$ and $Ht$.

16. A curved target course predictor for a gun fire control system comprising a Q computer, a deflection rate computer for producing signals proportional to $Xt$, $Qd(jXt)$ and $RhdB$, a height and horizontal range computer operable in response to signal proportional to Q, R, E, $Yo$, T, B and $Xt$ for producing signals proportional to $dH$, $Qd(dH)$, $dRh$, $Qd(jYt)$ and $Yt$, an acceleration smoothing network for producing signals proportional to $Kd(xt)$, $Kd(yt)$ and $Kd(dh)$, a prediction unit for mechanizing the equation $$Rto = (dRh)(Tf) + \tfrac{1}{2}Kd(yt)(Tf)^2$$

for producing a signal proportional to $Rto$ comprising a multiplier for multiplying a signal proportional to $Kd(yt)$ by a signal proportional to $Tf$ to produce a signal proportional to $Kd(yt)(Tf)$, a differential for adding the signal $Kd(yt)(Tf)$ and a signal proportional to $dRh$ to produce a signal proportional to $$dRh + Kd(yt)(Tf)$$

and a multiplier for multiplying a signal proportional to $dRh + \tfrac{1}{2}Kd(yt)(Tf)$ by the signal $Tf$ to produce a signal proportional to $Rto$, and a prediction unit for producing signals proportional to $Dto$ and $Ht$ in response to a signal proportional to $Tf$ and in response to the signals $dH$ and $Kd(dh)$.

17. A curved target course predictor for a gun fire control system, comprising a Q computer, a deflection rate computer for obtaining signals proportional to $Xt$, $Qd(jXt)$ and $RhdB$, a height and horizontal range computer operable in response to signals proportional to Q, R, E, $Yo$, T, B and $Xt$ for producing signals proportional to $dH$, $Qd(dH)$, $dRh$, $Qd(jYt)$ and $(Yt)$, an acceleration smoothing network for producing signals proportional to $Kd(xt)$, $Kd(yt)$ and $Kd(dh)$, a prediction unit operable in response to inputs $dRh$, $Tf$ and $Kd(yt)$ for producing a signal proportional to $Rto$, a prediction unit for mechanizing the equation $$Dto = (RhdB)(Tf) + \tfrac{1}{2}Kd(xt)(Tf)^2$$

to produce a signal proportional to $Dto$ comprising a multiplier for multiplying a signal proportional to $Kd(xt)$ by a signal proportional to $Tf$ to produce a signal proportional to $Kd(xt)(Tf)$, a differential for adding the signal $Kd(yt)(Tf)$ and a signal proportional to $RhdB$ to produce a signal proportional to $$RhdB + Kd(xt)(Tf)$$

and a multiplier for multiplying a signal proportional to $RhdB + \tfrac{1}{2}Kd(xt)(Tf)$ by the signal $Tf$ to produce a signal proportional to $Dto$, and a prediction unit for producing a signal proportional to $Ht$ in response to signals $dH$ and $Kd(dh)$ as inputs.

18. A curved target course predictor for a gun fire control system comprising a Q computer, a deflection rate computer for producing signals proportional to $Xt$, $Qd(jXt)$ and $RhdB$, a height and horizontal range computer operable in response to signals proportional to Q, R, E, $Yo$, T, B and $Xt$ for producing signals proportional to $dH$, $Qd(dH)$, $dRh$, $Qd(jYt)$ and $Yt$, an acceleration smoothing network for producing signals proportional to $Kd(xt)$, $Kd(yt)$ and $Kd(dh)$, a prediction unit operable in response to a signal proportional to $Tf$ and to the signals $dRh$, $Kd(yt)$, $RhdB$ and $Kd(xt)$ for producing signals proportional to $Rto$ and $Dto$, and a prediction unit for mechanizing the equation $$Ht = dH(Tf) + \tfrac{1}{2}Kd(dh)(Tf)^2$$

to obtain a signal proportional to $Ht$, and comprising a multiplier for multiplying a signal proportional to $Kd(dh)$ by a signal proportional to $Tf$ to produce a signal proportional to $Kd(dh)(Tf)$, a differential for adding the signal $Kd(dh)(Tf)$ and a signal proportional to $dH$ to produce a signal proportional to $$dH + Kd(dh)(Tf)$$

and a multiplier for multiplying a signal proportional to $dH + \tfrac{1}{2}Kd(dh)(Tf)$ by the signal $Tf$ to produce a signal proportional to $Ht$.

References Cited in the file of this patent

UNITED STATES PATENTS

| | | |
|---|---|---|
| 2,404,011 | White | July 16, 1946 |
| 2,408,081 | Lovell et al. | Sept. 24, 1946 |
| 2,435,195 | Bomberger et al. | Feb. 3, 1948 |
| 2,441,175 | White | May 11, 1948 |
| 2,602,587 | Dawson | July 8, 1952 |
| 2,660,371 | Campbell | Nov. 24, 1953 |
| 2,699,895 | Knowles | Jan. 18, 1955 |
| 2,713,457 | Bubb | July 19, 1955 |
| 2,754,058 | Crowther | July 10, 1956 |